(12) United States Patent  
Hyoudou

(10) Patent No.: US 7,830,420 B2
(45) Date of Patent: Nov. 9, 2010

(54) COMPOSITE IMAGE DATA GENERATING APPARATUS, METHOD OF CONTROLLING THE SAME, AND PROGRAM FOR CONTROLLING THE SAME

(75) Inventor: Manabu Hyoudou, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1005 days.

(21) Appl. No.: 11/408,935

(22) Filed: Apr. 24, 2006

(65) Prior Publication Data

US 2006/0239582 A1    Oct. 26, 2006

(30) Foreign Application Priority Data

Apr. 26, 2005    (JP)    ............... 2005-127531

(51) Int. Cl.
H04N 5/235    (2006.01)
H04N 5/228    (2006.01)
H04N 5/335    (2006.01)
H04N 5/222    (2006.01)

(52) U.S. Cl. .............. 348/229.1; 348/222.1; 348/294; 348/297; 348/333.02; 382/168; 382/274

(58) Field of Classification Search ......... 348/294–297, 348/222.1, 229.1, 333.01–333.13; 382/168, 382/274

See application file for complete search history.

(56) References Cited

U.S. PATENT DOCUMENTS

| | | | | |
|---|---|---|---|---|
| 5,187,747 | A * | 2/1993 | Capello et al. ............... | 382/124 |
| 7,301,563 | B1 * | 11/2007 | Kakinuma et al. ...... | 348/208.13 |
| 7,349,119 | B2 * | 3/2008 | Tsukioka ................... | 358/1.18 |
| 7,646,414 | B2 * | 1/2010 | Koseki et al. .......... | 348/333.01 |
| 2001/0007473 | A1 * | 7/2001 | Chuang et al. .............. | 348/362 |
| 2003/0095192 | A1 * | 5/2003 | Horiuchi ................. | 348/222.1 |
| 2003/0142275 | A1 * | 7/2003 | Yoshida ....................... | 353/31 |
| 2004/0095472 | A1 * | 5/2004 | Yoshida et al. ......... | 348/208.12 |
| 2004/0125220 | A1 * | 7/2004 | Fukuda et al. .............. | 348/234 |
| 2004/0169751 | A1 * | 9/2004 | Takemura et al. ........... | 348/294 |
| 2005/0230774 | A1 * | 10/2005 | Suzuki ....................... | 257/443 |

(Continued)

FOREIGN PATENT DOCUMENTS

JP    2001-94999    4/2001

(Continued)

OTHER PUBLICATIONS

Notification of Reasons for Refusal dated Sep. 14, 2010 (with English translation).

*Primary Examiner*—Jason Chan
*Assistant Examiner*—Michael Osinski
(74) *Attorney, Agent, or Firm*—McGinn IP Law Group, PLLC

(57) ABSTRACT

Low-sensitivity image data and high-sensitivity image data are synthesized at a ratio determined by a dynamic range. A composite image is displayed on a display screen. A histogram of the composite image is generated, and is displayed on the display screen. A user presses a dynamic range change button when he or she considers that the dynamic range of the composite image must be changed by seeing the histogram and the composite image. The dynamic range is changed, to obtain a composite image by the synthesis at the ratio determined by the changed dynamic range. It can be judged by the histogram whether or not the dynamic range must be changed.

13 Claims, 21 Drawing Sheets

U.S. PATENT DOCUMENTS

| | | |
|---|---|---|
| 2005/0237410 A1* | 10/2005 | Shiohara ................ 348/333.01 |
| 2006/0192878 A1* | 8/2006 | Miyahara et al. ....... 348/333.01 |
| 2006/0268127 A1* | 11/2006 | Sato et al. .............. 348/231.99 |
| 2007/0229698 A1* | 10/2007 | Kakinuma et al. .......... 348/362 |
| 2009/0051781 A1* | 2/2009 | Takemura et al. ........ 348/222.1 |

FOREIGN PATENT DOCUMENTS

| | | |
|---|---|---|
| JP | 2004-297614 | 10/2004 |
| JP | 2005-045713 | 2/2005 |

* cited by examiner

*Fig. 4*

| D RANG (%) | HIGH-SENSITIVITY γ high | LOW-SENSITIVITY γ low | SYNTHESIS TABL h_gain, l_gain | COLOR DIFFERENCE CORRECTION GAIN Cr | COLOR DIFFERENCE CORRECTION GAIN Cb |
|---|---|---|---|---|---|
| 100 | γ high | γ low | h_gain 100<br>l_gain 100 | 1.0 TIMES | 1.0 TIMES |
| 130 | γ high | γ low | h_gain 130<br>l_gain 130 | 1.02 TIMES | 1.02 TIMES |
| 150 | γ high | γ low | h_gain 150<br>l_gain 150 | 1.03 TIMES | 1.03 TIMES |
| 170 | γ high | γ low | h_gain 170<br>l_gain 170 | 1.05 TIMES | 1.05 TIMES |
| 200 | γ high | γ low | h_gain 200<br>l_gain 200 | 1.06 TIMES | 1.06 TIMES |
| 230 | γ high | γ low | h_gain 230<br>l_gain 230 | 1.08 TIMES | 1.08 TIMES |
| 250 | γ high | γ low | h_gain 250<br>l_gain 250 | 1.1 TIMES | 1.1 TIMES |
| 300 | γ high | γ low | h_gain 300<br>l_gain 300 | 1.13 TIMES | 1.13 TIMES |
| 350 | γ high | γ low | h_gain 350<br>l_gain 350 | 1.16 TIMES | 1.16 TIMES |
| 400 | γ high | γ low | h_gain 400<br>l_gain 400 | 1.20 TIMES | 1.20 TIMES |

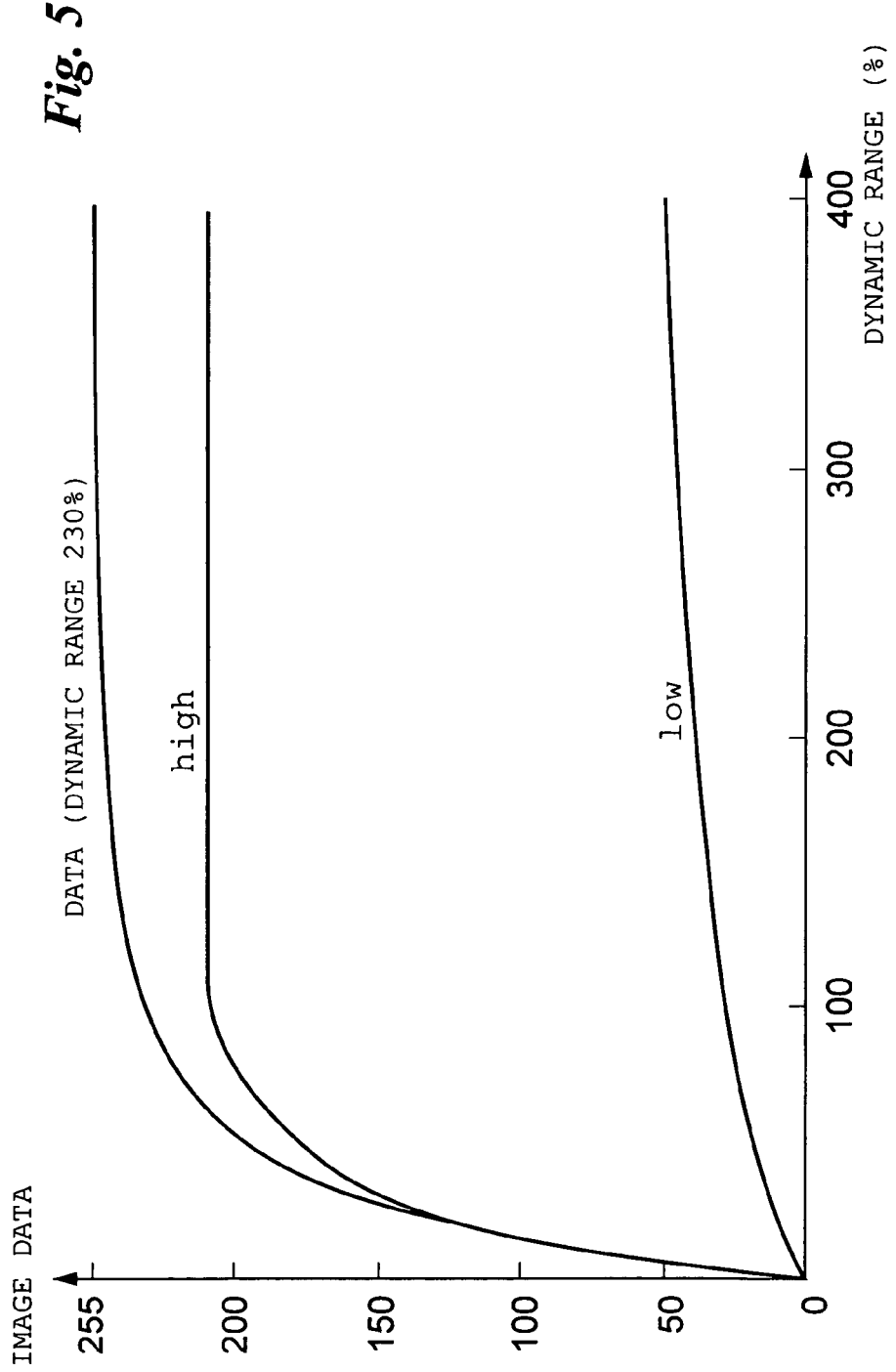

Fig. 24

| Exif (IMAGE INFORMATION ETC.) |
|---|
| PARAMETER FOR HIGH-SENSITIVITY IMAGE DATA |
| LMTX VALUE |
| WB GAIN VALUE |
| Dauto |
| Dset |
| Dmax |
| SYNTHESIS TABLE |
| : |
| PARAMETER FOR LOW-SENSITIVITY IMAGE DATA |
| LMTX VALUE |
| WB GAIN VALUE |
| Dauto |
| Dset |
| Dmax |
| SYNTHESIS TABLE |
| : |
| HIGH-SENSITIVITY RAW IMAGE DATA |
| LOW-SENSITIVITY RAW IMAGE DATA |

COMPOSITE IMAGE DATA GENERATING APPARATUS, METHOD OF CONTROLLING THE SAME, AND PROGRAM FOR CONTROLLING THE SAME

BACKGROUND OF THE INVENTION

1. Field of the Invention

The present invention relates to a composite image data generating apparatus and a program for controlling the same, and a composite image data generating method.

2. Description of the Background Art

In order to enlarge a dynamic range, exposure is performed two times, to synthesize obtained two images (JP-A-2001-94999).

However, it may not, in some cases, be found whether or not the dynamic range of an obtained composite image is proper.

SUMMARY OF THE INVENTION

An object of the present invention is to make it possible to relatively simply determine whether or not the dynamic range of an obtained composite image is proper.

A composite image data generating apparatus according to the present invention is characterized by comprising an image data synthesis device that synthesizes applied high-sensitivity image data and applied low-sensitivity image data at a ratio determined on the basis of a dynamic range to output composite image data; a histogram data generation device that generates histogram data representing a histogram of a composite image represented by the composite image data outputted from the image data synthesis device; a display control device that controls a display device so as to display the composite image represented by the composite image data outputted from the image data synthesis device and the histogram generated by the histogram data generation device; a dynamic range change device that changes the dynamic range; and a synthesis control device that controls the image data synthesis device so as to synthesize the applied high-sensitivity image data and the applied low-sensitivity image data in response to the change in the dynamic range by the dynamic range change device at a ratio determined on the basis of the changed dynamic range.

The present invention also provides a composite image data generating method suitable for the composite image data generating apparatus. That is, the method comprises the steps of synthesizing applied high-sensitivity image data and applied low-sensitivity image data at a ratio determined on the basis of a dynamic range to obtain composite image data; generating histogram data representing a histogram of a composite image represented by the obtained composite image data; controlling a display device so as to display the composite image represented by the obtained composite image data and the generated histogram; providing a dynamic range change device that changes the dynamic range; and synthesizing the applied high-sensitivity image data and the applied low-sensitivity image data in response to the change in the dynamic range by the dynamic range change device at a ratio determined on the basis of the changed dynamic range.

The present invention also provides a program suitable for the composite image data generating method.

According to the present invention, the applied high-sensitivity image data and the applied low-sensitivity image data are synthesized at the ratio determined on the basis of the dynamic range (which may be designated by a user or may be previously determined), to obtain the composite image data. The histogram of the composite image represented by the obtained composite image data, together with the composite image, is displayed. When it is considered that the composite image is not generated on the basis of the proper dynamic range by seeing the histogram, the dynamic range is changed. The high-sensitivity image data and the low-sensitivity image data are synthesized at the ratio determined on the basis of the changed dynamic range, to generate the composite image.

According to the present invention, the histogram is displayed, so that it can be determined whether or not the composite image has the proper dynamic range by seeing the histogram. When it is considered that the composite image does not have the proper dynamic range, a new composite image can be obtained by changing the dynamic range.

The display control device may control the display device so as to display the histogram in such a manner that the frequency of appearance of the composite image data whose level is not less than a predetermined level differs from the other frequency of appearance.

The composite image data generating apparatus may further comprise a dynamic range designation device that designates a dynamic range. In this case, the image data synthesis device will synthesize the applied high-sensitivity image data and the applied low-sensitivity image data at the ratio determined on the basis of the dynamic range to output the composite image data. Further, the composite image data generating apparatus will further comprise an automatic dynamic range determination device that determines an automatic dynamic range on the basis of at least one of the high-sensitivity image data and the low-sensitivity image data. The display control device will control the display device so as to display the dynamic range designated by the dynamic range designation device and the automatic dynamic range determined by the automatic dynamic range determination device in relation to an image of a dynamic range scale representing the range of the dynamic range.

The difference between the designated dynamic range and the automatic dynamic range is apparently found.

The composite image data generating apparatus may further comprise a solid-state electronic imaging (pickup) device that images (picks up) a subject to output the high-sensitivity image data and the low-sensitivity image data that represent a subject image. In this case, the image data synthesis device will synthesize the high-sensitivity image data and the low-sensitivity image data that are outputted from the solid-state electronic imaging device at the ratio determined on the basis of the dynamic range designated by the dynamic range designation device.

The composite image data generating apparatus may further comprise a composite image display control device that controls the display device so as to display the image represented by the composite image data outputted from the image data synthesis device, and a recording instruction switch that issues a recording instruction. In this case, the composite image data represents the image displayed on the display device will be recorded on a recording medium on the basis of control of the composite image display control device in response to the issue of the recording instruction from the recording instruction switch.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a parameter storage table;
FIGS. 5 and 6 show the relationship among high-sensitivity image data, low-sensitivity image data, and composite image data;
FIG. 24 shows the data structure of a memory card.

DESCRIPTION OF THE PREFERRED EMBODIEMNTS

Figure 1:
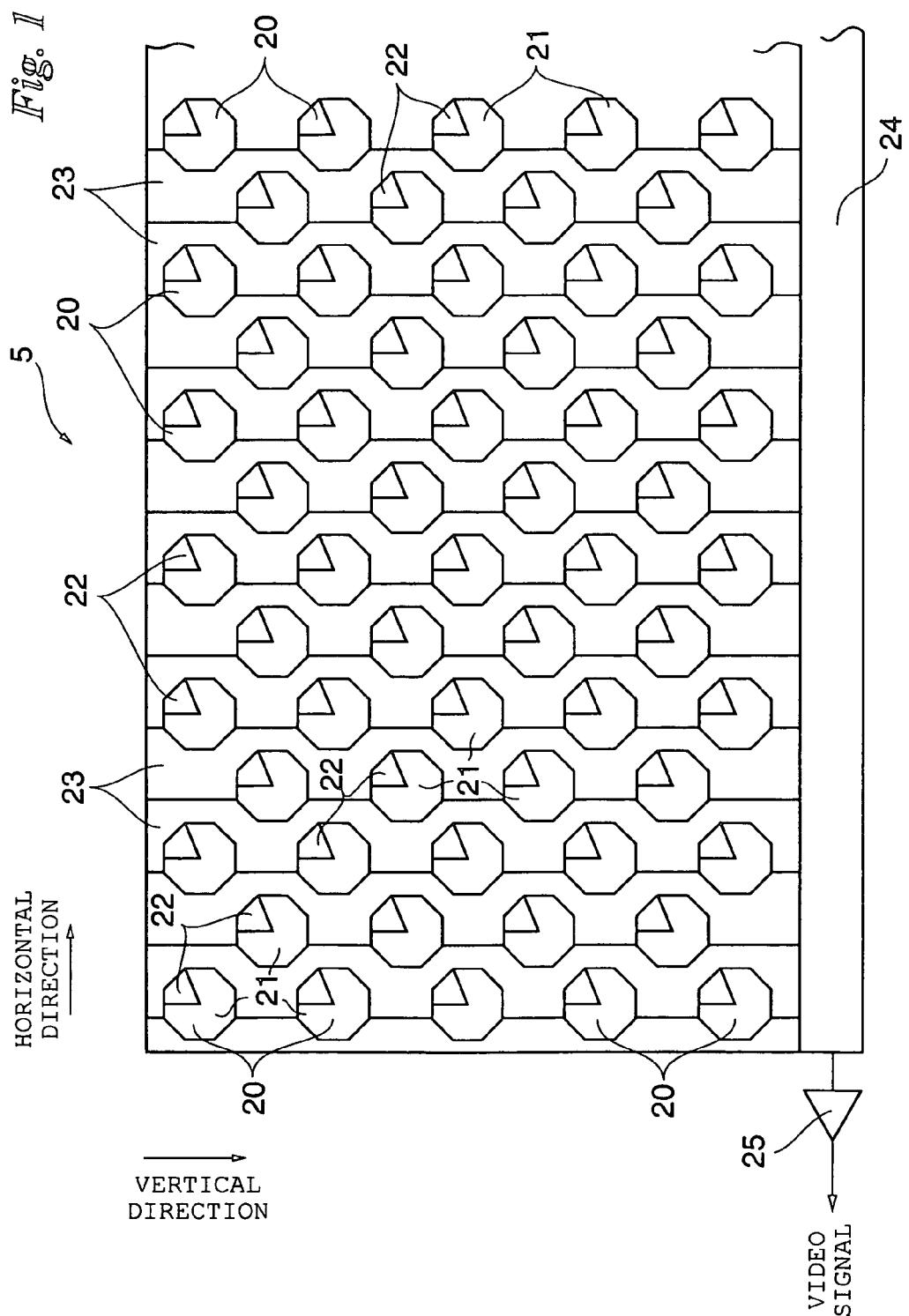
FIG. 1 is a schematic view of a CCD.

FIG. 1 schematically illustrates a CCD (Charge Coupled Device) 5 used for a digital still camera according to an embodiment of the present invention.

In the CCD 5, a large number of photodiodes 20 are arranged in the horizontal direction and the vertical direction. The photodiodes 20 in odd columns are arranged in odd rows, and the photodiodes 20 in even columns are arranged in even rows. The photodiodes 20 in even columns may be arranged in odd rows, and the photodiodes 20 in odd columns may be arranged in even rows.

A light receiving region of the photodiode 20 is divided into two light receiving regions. The one light receiving region 21 is referred to as a main light receiving region, and the other light receiving region 22 is referred to as a sub-light receiving region. The photodiode 20 is formed such that signal charges stored in the main light receiving region 21 and signal charges stored in the sub-light receiving region 22 are not mixed with each other. The ratio of the light receiving area of the main light receiving region 21 to the light receiving area of the sub-light receiving region 22 is defined as 4: 1. It goes without saying that the ratio may be another ratio.

A vertical transfer path 23 for transferring the signal charges stored in the photodiode 20 in the vertical direction is provided at the right of the photodiode 20. The signal charges stored in the main light receiving region 21 (referred to as main signal charges) out of the signal changes stored in the photodiode 20 are shifted to the vertical transfer path 23 from the photodiode 20. The main signal charges are applied to a horizontal transfer path 24, and are transferred in the horizontal direction. The main signal charges are amplified in an amplification circuit 25, and are outputted as a high-sensitivity video signal representing images corresponding to one frame from the CCD 5.

When the output of the high-sensitivity video signal is terminated, the signal charges stored in the sub-light receiving region 22 in the photodiode 20 (referred to as sub-signal charges) are shifted to the vertical transfer path 23. Similarly to the main signal charges, the sub-signal charges are transferred in the vertical direction within the vertical transfer path 23, and are applied to the horizontal transfer path 24. The sub-signal charges are transferred in the horizontal direction within the horizontal transfer path 24, and are outputted as a low-sensitivity video signal from the CCD 5 through the amplification circuit 25.

The light receiving area of the main light receiving region 21 is four times the light receiving area of the sub-light receiving region 22, so that the level of the high-sensitivity video signal is four times the level of the low-sensitivity video signal in a case where an identical subject is imaged.

Figure 2:
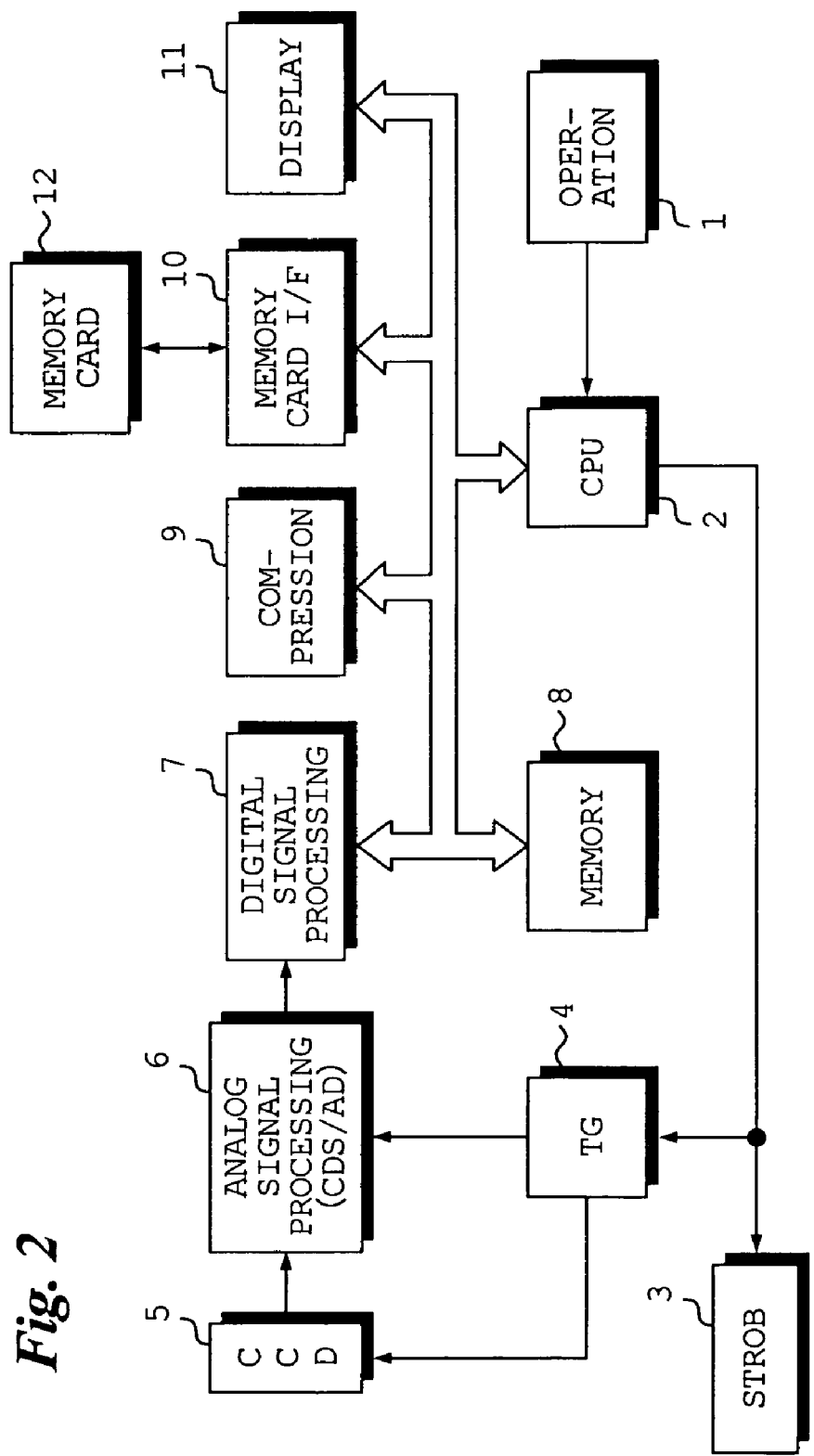
FIG. 2 is a block diagram showing the electrical configuration of a digital still camera.

FIG. 2 is a block diagram showing the electrical configuration of the digital still camera.

The overall operation of the digital still camera is supervised by a CPU 2. The operations, described later, of the digital still camera are performed on the basis of a preinstalled program. A user may install a program given through a memory card or an external input terminal.

The digital still camera comprises an operation device 1. The operation device 1 comprises various types of buttons such as a shutter release button, a wide button, a tele-button, upward, downward, rightward, and leftward arrow buttons, a menu/OK button, and a dynamic range change button. An output signal from the operation device 1 is inputted to the CPU 2.

In the digital still camera according to the present embodiment, various types of recording modes such as a recording mode in a case where a subject image is displayed on a cellular phone, a recording mode in a case where a subject image is printed using a printer, and a recording mode in a case where a subject image is displayed on a CRT (Cathode Ray Tube) display device can be set. A plurality of dynamic ranges suitable for the set recording mode are determined, and the plurality of dynamic ranges corresponding to the recording mode are displayed. The user designates, out of the plurality of dynamic ranges, the desired dynamic range. Image data representing a subject image having the designated dynamic range is recorded. Particularly in the present embodiment, the dynamic ranges, which are suitable for the recording mode selected by the user, are displayed, and the dynamic ranges, which are not suitable for the selected recording mode, are not displayed. The user designates the desired dynamic range out of the dynamic ranges suitable for the selected recording mode. Therefore, the image data representing the subject image having the relatively suitable dynamic range is recorded.

The digital still camera comprises a strobe flashing device 3 for irradiating strobe light onto a subject.

The digital still camera comprises a timing generator 4 for generating various types of clock pulses and others. The clock pulses and others outputted from the timing generator 4 are applied to the CCD 5 and an analog signal processing circuit 6.

When a subject is imaged by the CCD 5, a high-sensitivity video signal and a low-sensitivity video signal that represent a subject image are successively outputted, as described above. The high-sensitivity video signal and the low-sensitivity video signal are successively inputted to the analog signal processing circuit 6, where correlation double sampling processing and analog-to-digital conversion processing are performed, to obtain high-sensitivity image data and low-sensitivity image data. The high-sensitivity image data and the low-sensitivity image data are applied to a memory 8 after passing through a digital signal processing circuit 7, and is temporarily stored therein.

The high-sensitivity image data and the low-sensitivity image data are read out of the memory 8, and are inputted to the digital signal processing circuit 7. In the digital signal processing circuit 7, image synthesis processing is performed, so that composite image data representing a composite image is generated. The image synthesis processing will be described in detail later. The composite image data is applied to a display device 11, where the composite image is displayed on a display screen of the display device 11.

When the shutter release button is pressed, the composite image data representing the composite image displayed on the display screen of the display device 11 is applied from the memory 8 to a compression circuit 9, where data compression based on JPEG (joint photographic experts group) or the like is performed. The compressed composite image data is applied to a memory card 12 through a memory card interface 10, and is recorded thereon.

Figure 3:
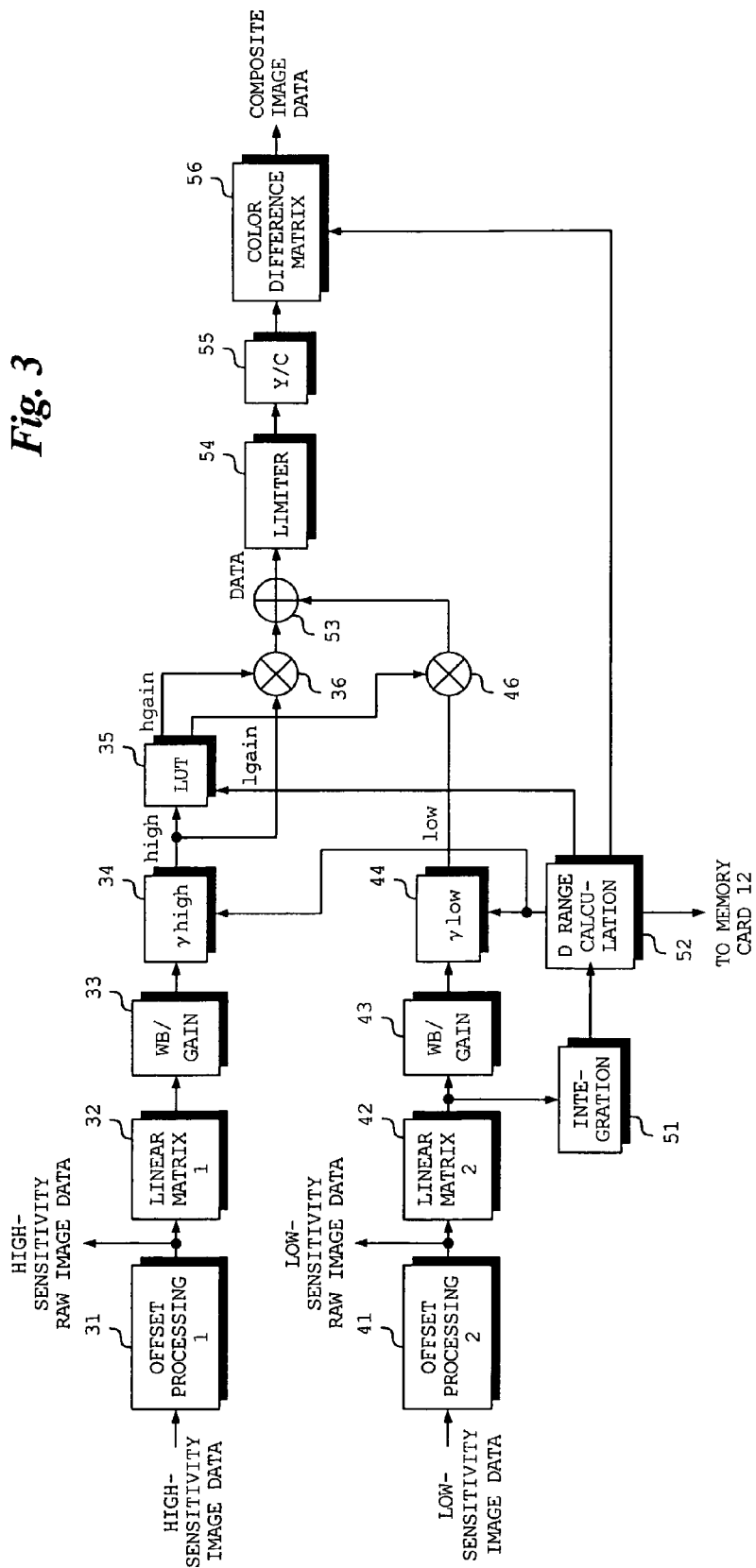
FIG. 3 is a block diagram showing the electrical configuration of an image data synthesis circuit.

FIG. 3 is a block diagram showing the electrical configuration of an image data synthesis circuit included in the digital signal processing circuit 7.

As described above, the high-sensitivity image data and the low-sensitivity image data that are stored in the memory 8 are read, and are inputted to the image data synthesis circuit. High-sensitivity image data H and low-sensitivity image data L are respectively subjected to offset processing in offset processing circuits 31 and 41. High-sensitivity RAW image data and low-sensitivity RAW image data that are respectively outputted from the offset processing circuits 31 and 41 are subjected to color tone correction processing for correcting spectral characteristics of the CCD 5 in linear matrix circuits 32 and 42. In the present embodiment, the high-sensitivity RAW image data and the low-sensitivity RAW image data can be also recorded on the memory card 12. Therefore, the high-sensitivity RAW image data and the low-sensitivity RAW image data that are respectively outputted from the offset processing circuits 31 and 41 are also applied to the memory card 12.

High-sensitivity image data and low-sensitivity image data that are outputted from the linear matrix circuits 32 and 42 are respectively applied to white balance/gain control circuits 33 and 43, where they are subjected to gain control processing such that 14-bit high-sensitivity image data and low-sensitivity image data that are inputted are respectively changed into 10-bit high-sensitivity image data and low-sensitivity image data and are subjected to white balance control. The high-sensitivity image data and the low-sensitivity image data that are outputted from the white balance/gain control circuits 33 and 43 are respectively applied to gamma correction circuits 34 and 44.

The low-sensitivity image data outputted from the linear matrix circuit 42 for low-sensitivity image data is also applied to an integration circuit 51. In the integration circuit 51, data representing the maximum value Gmax of a green component is calculated, as described later. The calculated data representing the maximum value Gmax of the green component is applied to a D range calculation circuit 52. In the D range calculation circuit 52, an automatic dynamic range Dauto is calculated, as described later.

The D range calculation circuit 52 also contains a memory (not shown), and the memory stores a parameter storage table shown in FIG. 4.

Referring to FIG. 4, the parameter storage table stores gamma correction characteristics γhigh of the gamma correction circuit 34 for high-sensitivity image data, gamma correction characteristics γlow of the gamma correction circuit 44 for low-sensitivity image data, a synthesis table (a combination of a coefficient hgain by which high-sensitivity image data high is multiplied and a coefficient lgain by which low-sensitivity image data low is multiplied), color difference correction gain Cr, and color difference correction gain Cb in correspondence with dynamic ranges (D ranges) 100%, 130%, 150%, 170%, 200%, 230%, 250%, 300%, 350%, and 400%.

As described later, the gamma correction characteristics γhigh of the gamma correction circuit 34 for high-sensitivity image data, the gamma correction characteristics γlow of the gamma correction circuit 44 for low-sensitivity image data, the synthesis table, the color difference correction gain Cr, and the color difference correction gain Cb are read from the parameter storage table in correspondence with the value of the dynamic range designated by the user or the value of an automatic dynamic range calculated by being designated by the user. Read parameters are respectively given to the gamma correction circuit 34 for high-sensitivity image data, the gamma correction circuit 44 for low-sensitivity image data, a LUT (Look-up Table) 35, and a color difference matrix 56. The parameters and others are given to the memory card 12, and are recorded thereon.

The high-sensitivity image data high (8 bits by gamma processing) outputted from the gamma correction circuit 34 for high-sensitivity image data is applied to the LUT 35 and a first multiplication circuit 36, and the low-sensitivity image data low (8 bits by gamma processing) outputted from the gamma correction circuit 44 for low-sensitivity image data is applied to a second multiplication circuit 46.

Data for designating the synthesis table (coefficients hgain and lgain) corresponding to the calculated dynamic range is applied to the D range calculation circuit 52 and the LUT 35. The data for designation is applied so that the synthesis table designated in the LUT 35 is set. The set coefficient hgain and the set coefficient lgain are respectively given to the first multiplication circuit 36 and the second multiplication circuit 46. The high-sensitivity image data high is multiplied by the coefficient hgain (high×hgain) in the first multiplication circuit 36, and the low-sensitivity image data low is multiplied by the coefficient lgain (low×lgain) in the second multiplication circuit 46.

Data (high×hgain) outputted from the first multiplication circuit 36 and data (low×lgain) outputted from the second multiplication circuit 46 are added, to obtain composite image data DATA having a dynamic range Dset set by the user or the automatic dynamic range Dauto (DATA=high×hgain+ low×lgain).

The amplitude of the composite image data DATA is limited in a limiter 54, so that composite luminance data and composite color difference data are generated in a Y/C processing circuit 55. The composite color difference data is corrected by multiplying color difference gain correction values Cr and Cb given from the D range calculation circuit 52 by a reference gain in the color difference matrix circuit 56. In the color difference matrix circuit 56, the wider the dynamic range becomes, the larger the color difference gain correction value becomes.

The composite luminance data and the composite color difference data that are outputted from the color difference matrix circuit 56 are applied to the memory 8, and are temporarily stored therein. The composite luminance data and the composite color difference data are read out of the memory 8, and are applied to the display device 11. An initial image having the dynamic range Dset set by the user or the automatic dynamic range Dauto is displayed on the display screen of the display device 11.

Figure 6:
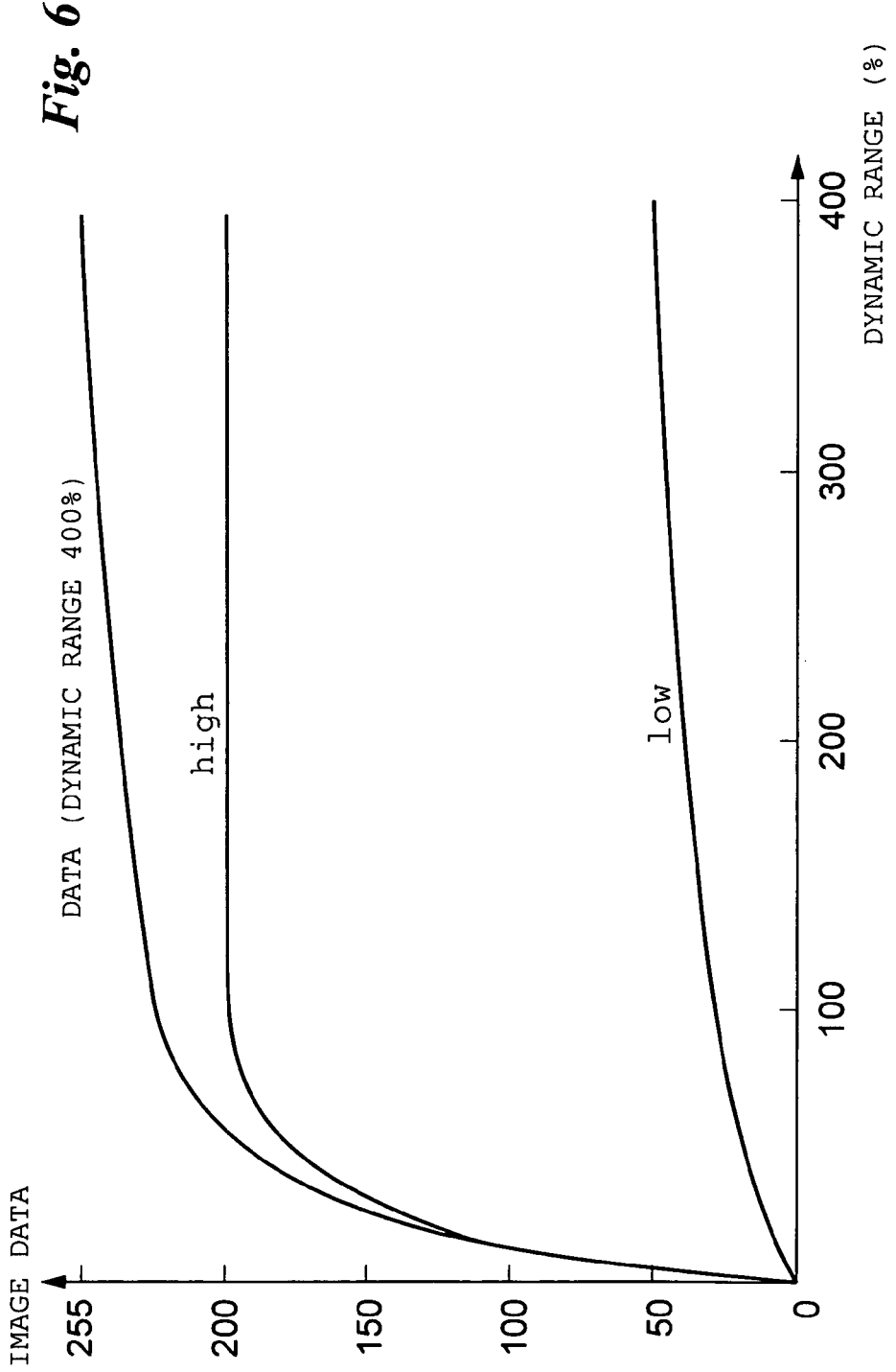

FIGS. 5 and 6 show the relationship among the high-sensitivity image data high, the low-sensitivity image data low, and the composite image data DATA.

As described above, the high-sensitivity image data high is multiplied by the coefficient hgain, to obtain the corrected high-sensitivity image data (high×hgain), and the low-sensitivity image data low is multiplied by the coefficient lgain, to obtain the corrected low-sensitivity image data (low×lgain) is obtained. The obtained corrected high-sensitivity image data (high×hgain) and corrected low-sensitivity image data (low×lgain) are added, to obtain the composite image data DATA, as described above.

As shown in FIG. 5, when the dynamic range is 230%, synthesis processing of the high-sensitivity image data high and the low-sensitivity image data low is performed such that the dynamic range of the composite image data DATA becomes 230%.

Similarly, as shown in FIG. 6, when the dynamic range is 400%, synthesis processing of the high-sensitivity image data high and the low-sensitivity image data low is performed such that the dynamic range of the composite image data DATA becomes 400%.

Figure 7:
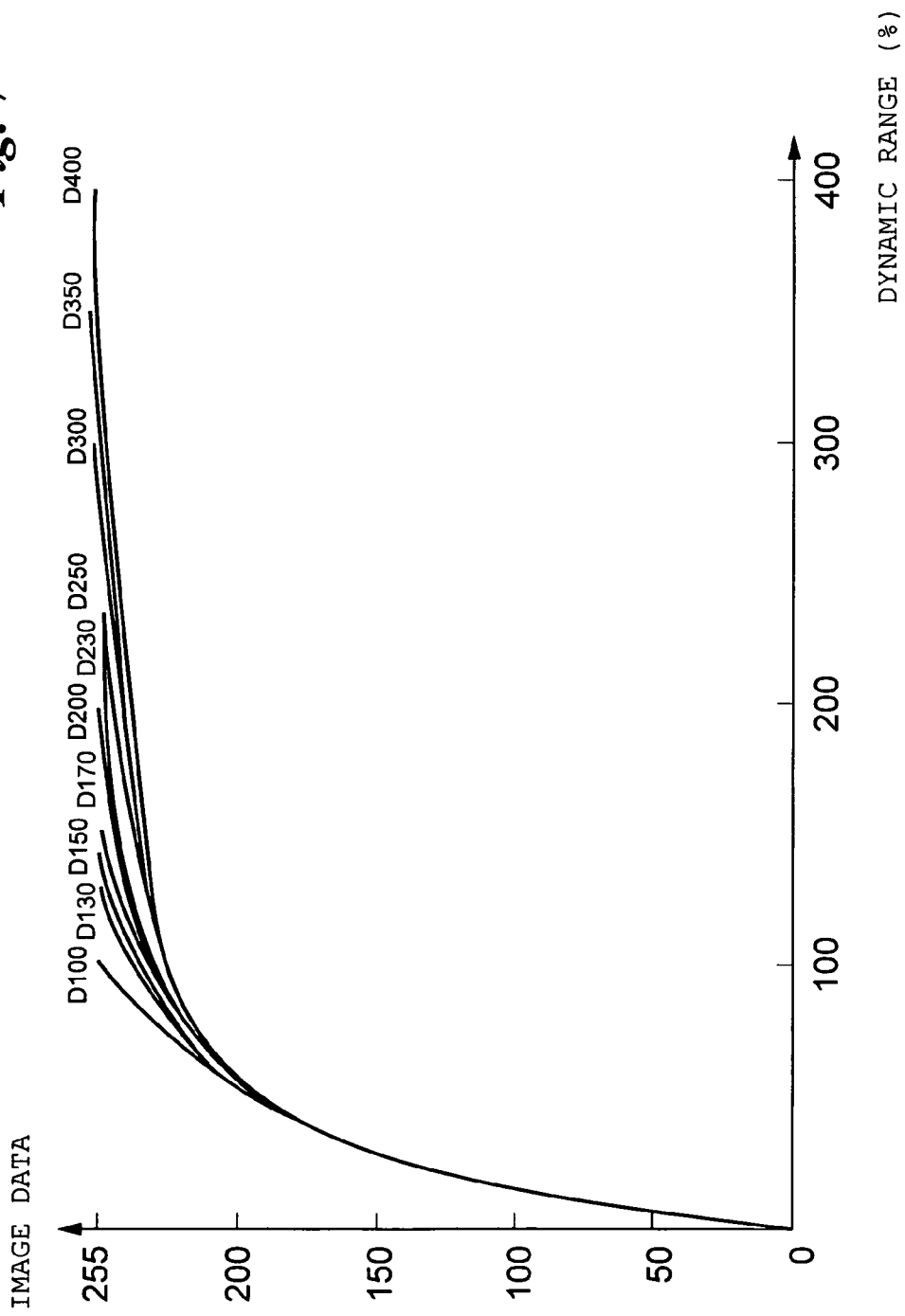
FIG. 7 shows composite image data which differ in dynamic ranges.

FIG. 7 shows the relationship between the level of composite image data and the dynamic range thereof.

In the present embodiment, composite image data D100, D130, D150, D170, D200, D230, D250, D300, D350, and D400 can respectively have dynamic ranges of 100%, 130%, 150%, 170%, 200%, 230%, 250%, 300%, 350%, and 400%. In order that the composite image data can respectively have the dynamic ranges, a coefficient hgain of the high-sensitivity image data (hereinafter referred to as high-sensitivity image data coefficient hgain) and a coefficient lgain of the low-sensitivity image data (hereinafter referred to as low-sensitivity image data coefficient lgain) are stored as a synthesis table in correspondence with each of the dynamic ranges, as described above.

Figure 8:
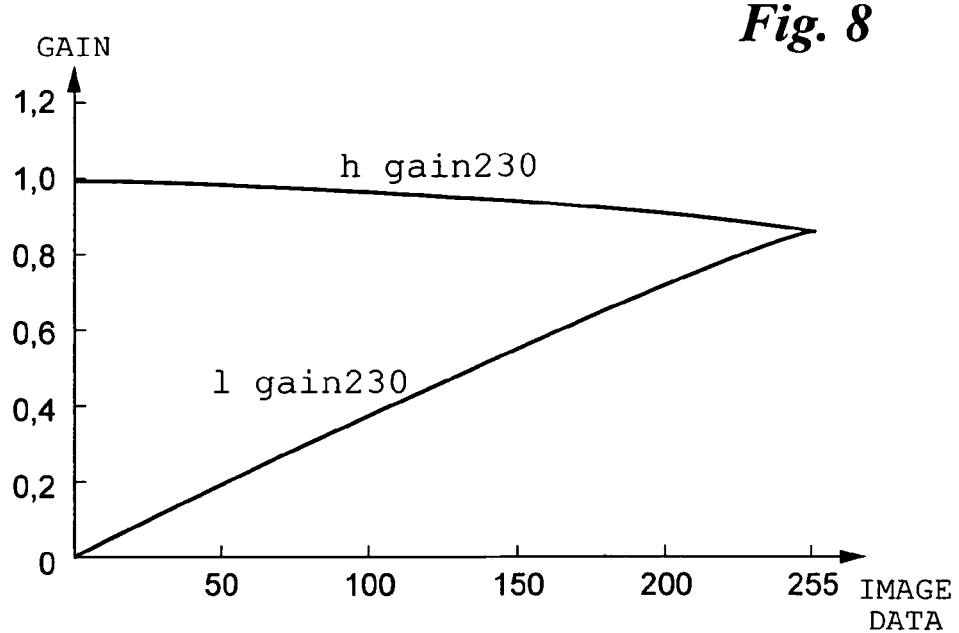
FIG. 8 graphically shows a synthesis table in a case where the dynamic range is 230%.
Figure 9:
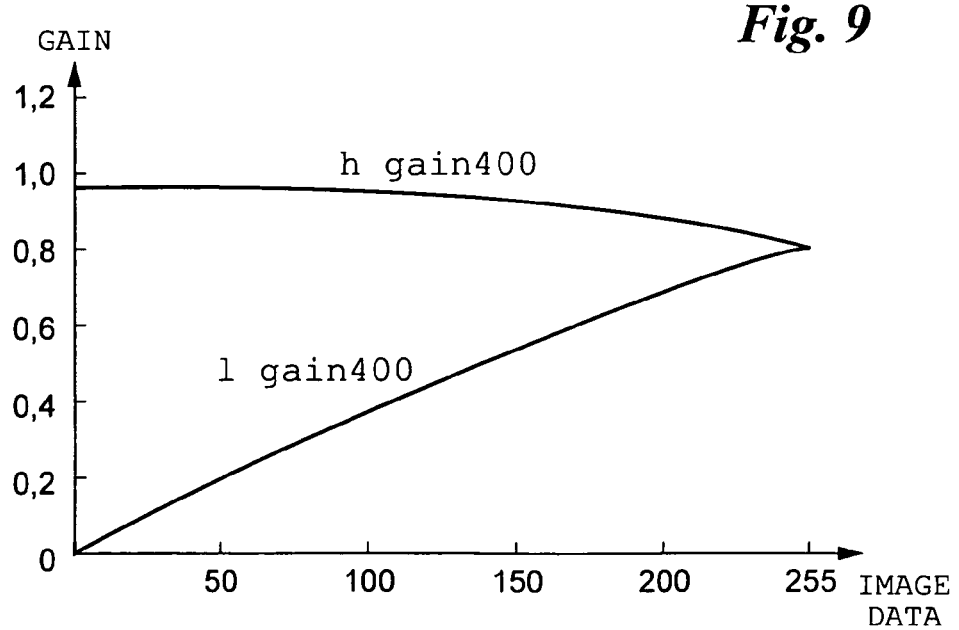
FIG. 9 graphically shows a synthesis table in a case where the dynamic range is 400%.
Figure 10:
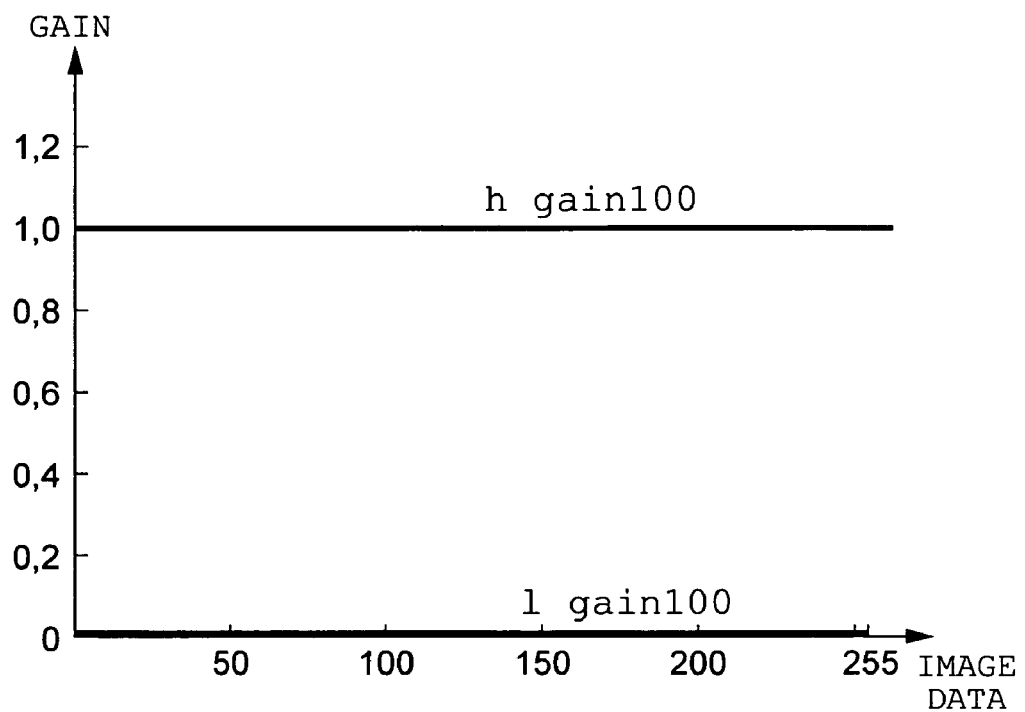
FIG. 10 graphically shows a synthesis table in a case where the dynamic range is 100%.

FIGS. 8 to 10 graphically show an example of a synthesis table represented by a graph.

FIG. 8 shows a high-sensitivity image data coefficient hgain and a low-sensitivity image data coefficient lgain that constitute a synthesis table used when the dynamic range is 230%, and FIG. 9 shows a high-sensitivity image data coefficient hgain and a low-sensitivity image data coefficient lgain that constitute a synthesis table used when the dynamic range is 400%. The synthesis tables are used so that composite image data respectively having the dynamic ranges of 230% and 400% are obtained.

Each of the respective high sensitivity image data coefficients hgain shown in FIGS. 8 and 9 is defined such that as the level of the high-sensitivity image data high increases, the level of hgain gradually becomes low. The coefficient hgain is defined such that the level of the high-sensitivity image data high in a case where the dynamic range is 400% is slightly lower than that in a case where the dynamic range is 230%.

Each of the respective low-sensitivity image data coefficients lgain shown in FIGS. 8 and 9 is defined such that as the level of the low-sensitivity image data low increases, the ratio of the low-sensitivity image data low to the composite image data DATA increases. The coefficient lgain is defined such that as the level of the low-sensitivity image data low increases, the ratio of the low-sensitivity image data low to the composite image data DATA in a case where the dynamic range is 230% is higher than that in a case where the dynamic range is 400%.

First, a suitable high sensitivity image data coefficient hgain is determined. The low sensitivity image data coefficient lgain is determined from corrected high-sensitivity image data (high×hgain) obtained by multiplying the determined coefficient hgain by the high-sensitivity image data high, composite image data DATA having a target dynamic range, and low-sensitivity image data low at various levels.

FIG. 10 shows a high-sensitivity image data coefficient hgain and a low-sensitivity image data coefficient lgain that constitute a synthesis table used when the dynamic range is 100%.

When the dynamic range is 100%, the coefficient hgain becomes one irrespective of the level of high-sensitivity image data high, and the coefficient lgain becomes zero irrespective of the level of low-sensitivity image data low. Consequently, the high-sensitivity image data high and composite image data DATA coincide with each other when the dynamic range is 100%.

Figure 11:
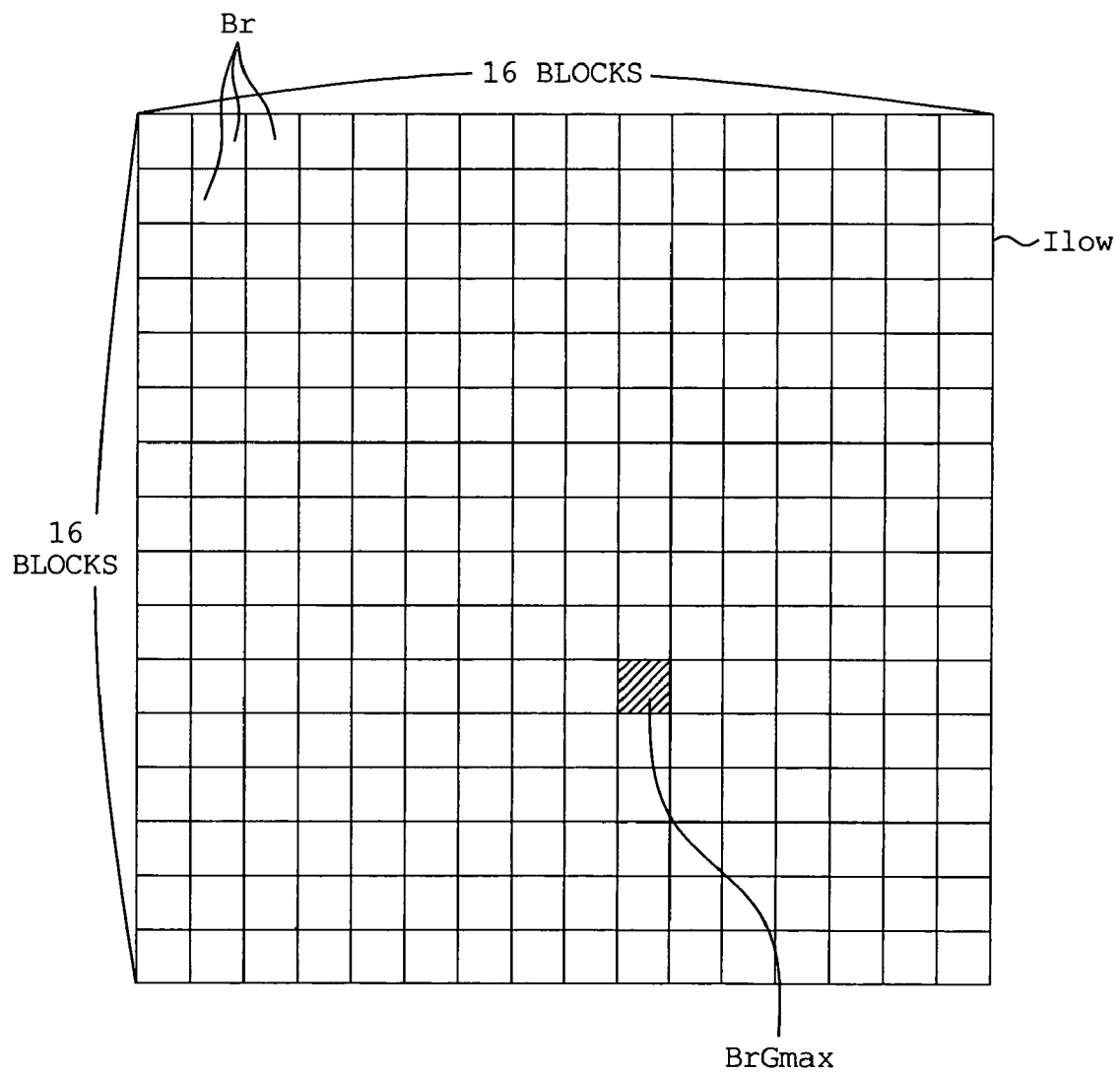
FIG. 11 shows how an image is divided.

FIG. 11 shows a low-sensitivity image Ilow corresponding to one frame represented by low-sensitivity image data low.

An automatic dynamic range Dauto is determined utilizing the low-sensitivity image Ilow.

The low-sensitivity image Ilow is divided into 16 blocks in both the horizontal direction and the vertical direction, to obtain 256 blocks Br. Green data are integrated in each of the obtained 256 blocks Br. The maximum integrated value Gmax out of the integrated values of the green data for the blocks Br (the block giving the maximum integrated value Gmax is indicated by a sign BrGmax) is detected in the integration circuit 51. Consequently, the automatic dynamic range Dauto is found in the following manner.

First, a temporarily dynamic range Dx is obtained from the following equation 1:

$$Dx = G\max \times 400\%/4095 \quad \text{equation 1}$$

In the equation 1, the low-sensitivity image data low is indicated by 14 bits so that the maximum integrated value Gmax is also indicated by 14 bits, and the number of subpixels giving the low-sensitivity image data low is a maximum of 4095 because it is one-fourth the number of main pixels giving high-sensitivity image data high. An output 4095 of the low-sensitivity image data low corresponds to 400% of the dynamic range, so that the temporarily dynamic range Dx is calculated in a proportional operation expressed by the equation 1.

The automatic dynamic range Dauto is determined in the D range calculation circuit 52, as expressed by equations 2 to 7, depending on the value of the dynamic range Dx thus calculated:

$$\text{When Dx is less than 115\%, Dauto}=100\% \quad \text{equation 2}$$

$$\text{When Dx is not less than 115\% and less than 150\%,} \\ \text{Dauto}=130\% \quad \text{equation 3}$$

$$\text{When Dx is not less than 150\% and less than 200\%,} \\ \text{Dauto}=170\% \quad \text{equation 4}$$

When Dx is not less than 200% and less than 260%,
$$D_{auto} = 230\% \quad \text{equation 5}$$

When Dx is not less than 260% and less than 350%,
$$D_{auto} = 300\% \quad \text{equation 6}$$

When Dx is not less than 350%, $D_{auto} = 400\%$ equation 7

Figure 12:
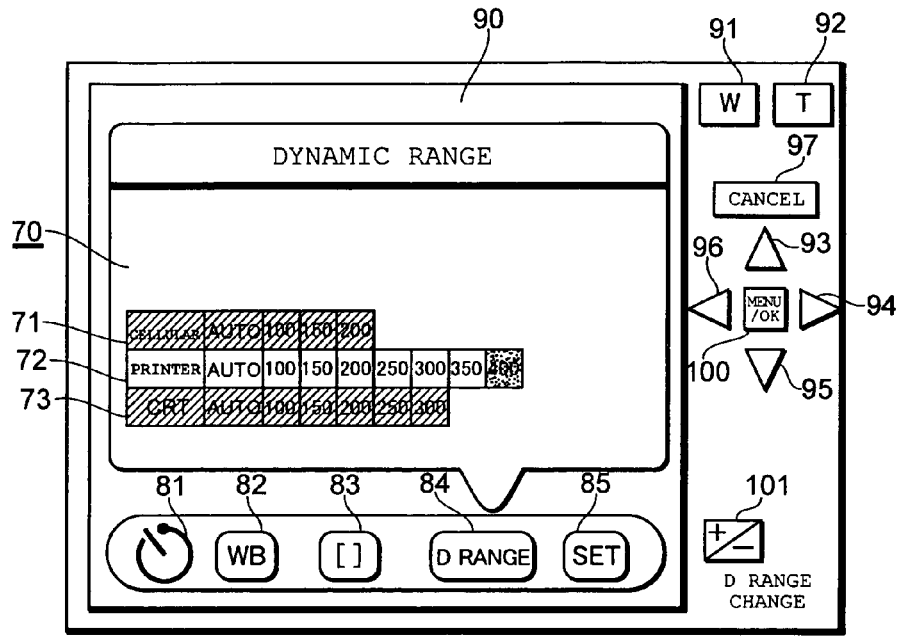
FIGS. 12 to 16 are rear views of the digital still camera.

FIG. 12 is a rear view of the digital still camera.

A display screen 90 is formed over the whole of a rear surface of the digital still camera.

A wide button 91, a tele-button 92, and a cancel button 97 are provided in a right part of the display screen 90. A menu/OK button 100 is provided below the cancel button 97. An upward arrow button 93, a rightward arrow button 94, a downward arrow button 95, and a leftward arrow button 96 are provided around the menu/OK button 100. Further, a dynamic range change button 101 is provided in a lower right part of the digital still camera.

A self-timer icon 81, a white balance icon 82, a focal position icon 83, a dynamic range icon 84, and a set icon 80 are displayed in a lower part of the display screen 90. The self-timer icon 81 is selected when a self-timer is set. The white balance icon 82 is selected when white balance control is carried out. The focal position icon 83 is selected when a focal position is adjusted. The dynamic range icon 84 is selected when a dynamic range is set. The set icon 84 is selected when various settings of the digital still camera are made.

Any one of the icons 81 to 85 is brightly lighting up. The menu/OK button 100 is pressed so that the icon brightly lighting up is selected. The leftward arrow button 96 is pressed so that the icon at the left of the icon brightly lighting up newly brightly lights up, and the rightward arrow button 94 is pressed so that the icon at the right of the icon brightly lighting up newly brightly lights up. The desired icon can be selected using the leftward arrow button 96, the rightward arrow button 94, and the menu/OK button 100.

In FIG. 12, the dynamic range icon 84 is selected, and a dynamic range setting initial image 70 is displayed on the display screen 90.

The dynamic range setting initial image 70 is for allowing a dynamic range to be set for each recording application (recording mode) of the above-mentioned composite image data obtained by imaging. A partition 71 having characters "cellular" displayed therein, a partition 72 having characters "printer" displayed therein, and a partition 73 having characters "CRT" displayed therein are displayed on the dynamic range setting initial image 70.

There are partitions respectively having characters "AUTO", "100", "150", and "200" displayed therein at the right of the partition 71. There are partitions respectively having characters "AUTO", "100", "150", "200", "250", "300", "350", and "400" displayed therein at the right of the partition 72. There are partitions respectively having characters "AUTO", "100", "150", "200", and "300" displayed therein at the right of the partition 72. There are partitions respectively having characters "350" and "400" displayed therein. The characters in each of the partitions displayed at the right of the partitions 71, 72, and 73 indicate a dynamic range that can be set by the user. "AUTO" means an automatic dynamic range, and "100", "150", "200", "250", "300", "350", and "400" respectively mean that the dynamic range is 100%, 150%, 200%, 250%, 300%, 350%, and 400%.

Any one of the partitions 71, 72, and 73 is lighting up more brightly than the other partitions (the dark partitions are indicated by hatching). The upward arrow button 93 or the downward arrow button 94 is pressed so that the partition above or below the partition lighting up brightly lights up. The partition lighting up is a partition selected by the user. Any one of the partitions at the right of the partition selected by the user is brightly lighting up. The leftward arrow button 96 or the rightward arrow button 94 is pressed so that the partition at the left or the right of the partition lighting up brightly lights up. In an example shown in FIG. 12, the partition 72 is selected, and the partition having characters "400" displayed therein is selected by the user. When the menu/OK button 100 is pressed, 400% is designated as a dynamic range.

Displayed as characters (a dynamic range) in the partition displayed at the right of each of the partitions 71, 72, and 73 are ones suitable for the recording application indicated by the displayed partition. Consequently, the user can designate the desired dynamic range out of the dynamic ranges suitable for the recording applications, which can prevent the dynamic range unsuitable for the recording applications from being designated by the user.

In a case where the dynamic range icon 84 is brightly lighting up, when the menu/OK button 100 is pressed, the dynamic range setting initial image is displayed, as shown in FIG. 12. On the other hand, in a case where the dynamic range icon 84 is brightly lighting up, when the downward arrow button 95 is pressed, another dynamic range setting image is displayed on the display screen 90.

Figure 13:
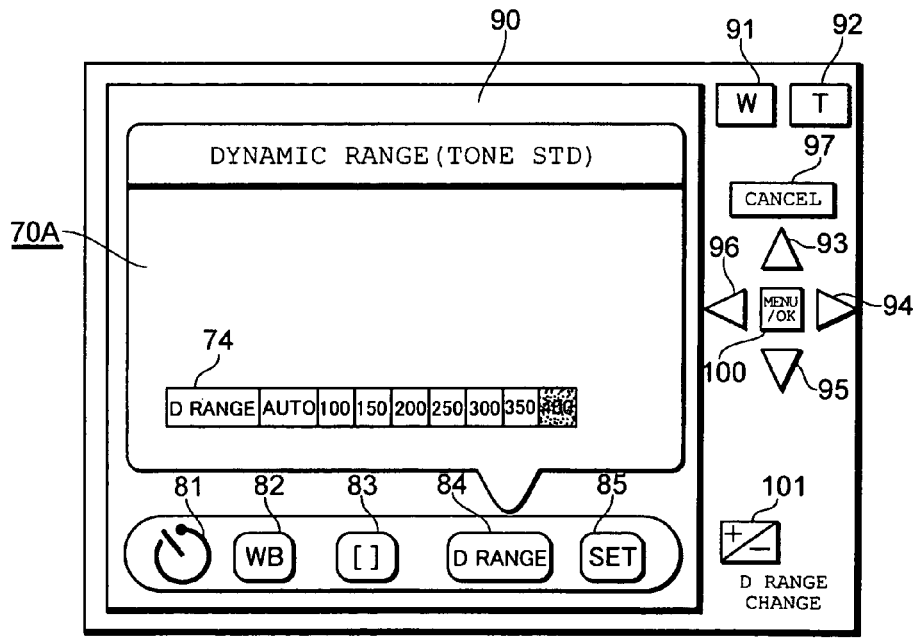

FIG. 13 illustrates an example of a dynamic range setting image 70A for tone STD (Standard).

A partition 74 having characters "D range" displayed therein is displayed on the dynamic range setting image 70A for tone STD (in a case where a subject image is recorded in a standard tone). There are partitions respectively having characters "AUTO", "100", "150", "200", "250", "300", "350", and "400" displayed therein at the right of the partition 74. It is found that the user can designate an automatic dynamic range or a dynamic range of 100%, 150%, 200%, 250%, 300%, 350%, or 400% in a case where composite image data is recorded in accordance with the tone STD.

Figure 14:
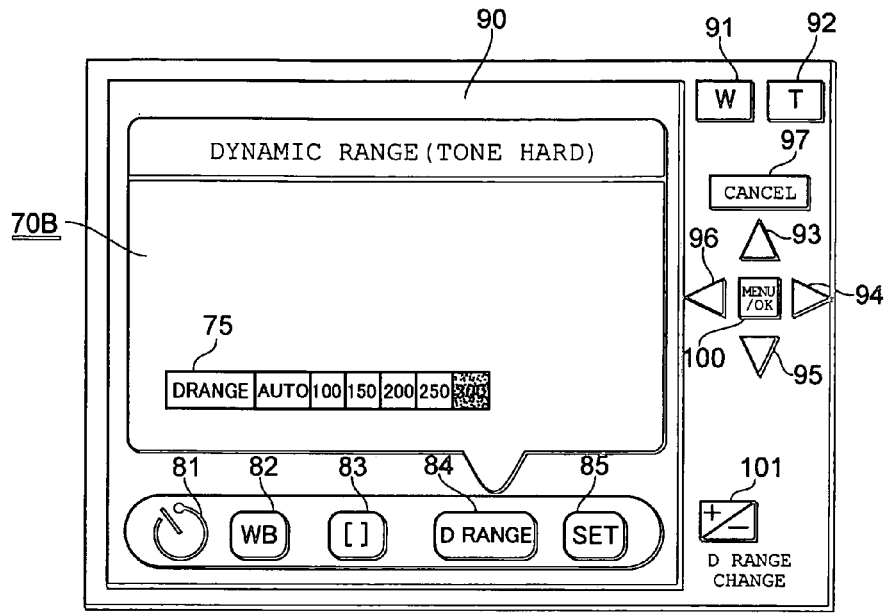

FIG. 14 illustrates an example of a dynamic range setting image 70B for tone HARD.

The dynamic range setting image 70B for tone HARD (in a case where a subject image is recorded in a hard tone) is displayed by pressing the leftward arrow button 96 when the dynamic range setting image 70A for tone STD shown in FIG. 12 is displayed.

A partition 75 having characters "D range" displayed therein is also displayed on the dynamic range setting image 70B for tone HARD. There are partitions respectively having characters "AUTO", "100", "150", "200", "250", and "300" displayed therein at the right of the partition 75. It is found that the user can designate an automatic dynamic range or a dynamic range of 100%, 150%, 200%, 250%, or 300% in a case where composite image data is recorded in accordance with the tone STD.

Figure 15:
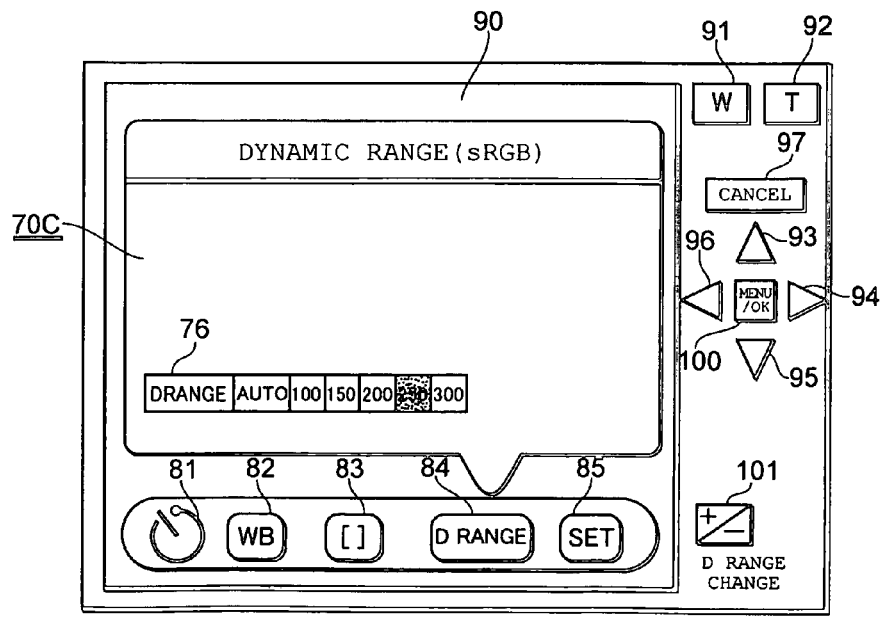

FIG. 15 illustrates an example of a dynamic range setting image 70C for an sRGB color space.

The dynamic range setting image 70C for an sRGB color space is displayed by pressing the leftward arrow button 96 when the dynamic range setting image 70B for tone HARD shown in FIG. 14 is displayed.

A partition 76 having characters "D range" displayed therein is also displayed on the dynamic range setting image 70C for an sRGB color space. There are partitions respectively having characters "AUTO", "100", "150", "200", "250", and "300" displayed therein at the right of the partition 76. It is found that the user can designate an automatic dynamic range or a dynamic range of 100%, 150%, 200%, 250%, or 300% in a case where composite image data is recorded in accordance with the sRGB color space.

Figure 16:
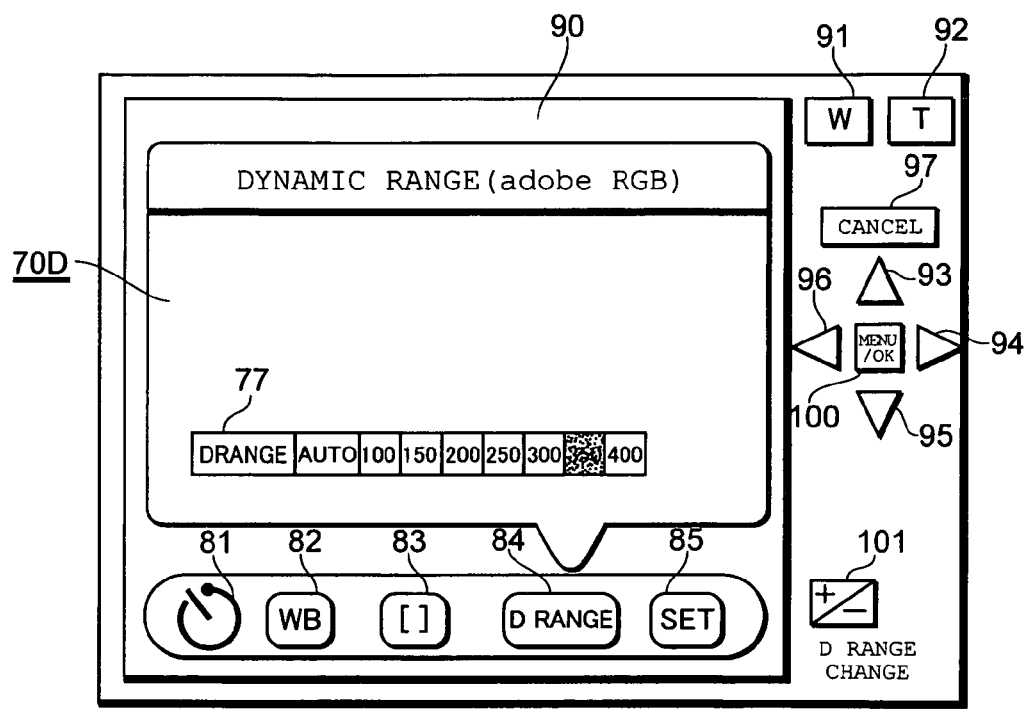

FIG. 16 illustrates an example of a dynamic range setting image 70C for an adobe RGB color space.

The dynamic range setting image 70D for an adobe RGB color space is displayed by pressing the leftward arrow button 96 when the dynamic range setting image 70C for an sRGB color space shown in FIG. 15 is displayed.

A partition 77 having characters "D range" displayed therein is also displayed on the dynamic range setting image 70D for an adobe RGB color space. There are partitions respectively having characters "AUTO", "100", "150", "200", "250", "300", "350", and "400" displayed therein at the right of the partition 77. It is found that the user can designate an automatic dynamic range or a dynamic range of 100%, 150%, 200%, 250%, 300%, 350%, or 400% in a case where composite image data is recorded in accordance with the adobe RGB color space.

Figure 17:
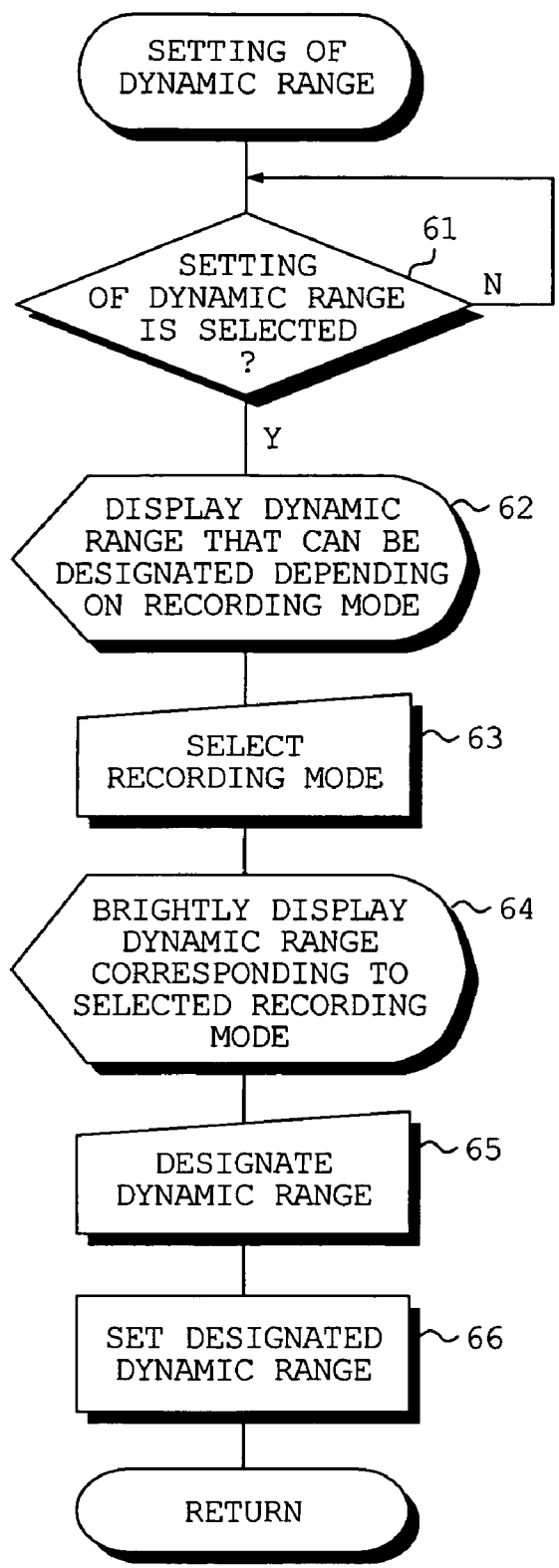
FIG. 17 is a flow chart showing the procedure for dynamic range setting processing.

FIG. 17 is a flow chart showing the procedure for dynamic range setting processing.

When the dynamic range icon 84 is selected (YES in step 61), a plurality of dynamic ranges that can be designated are displayed on the display screen 90 depending on a recording mode (recording application) as shown in FIG. 12 (step 62). First, a recording mode is selected by a user (step 63). A plurality of dynamic ranges corresponding to the selected recording mode are brightly displayed (step 64). The user designates the desired dynamic range out of the plurality of dynamic ranges that are brightly displayed (step 65). The digital still camera is set such that the above-mentioned composite image data is generated in the designated dynamic range (step 66).

Figure 18:
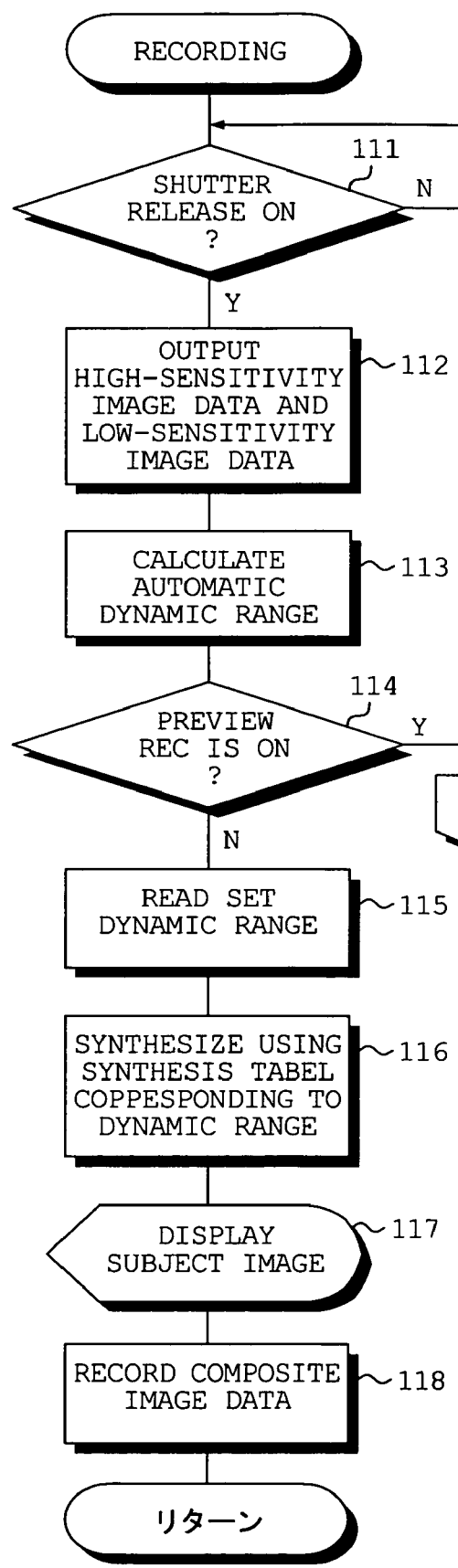
FIGS. 18 and 19 are flow charts showing the procedure for recording processing of the digital still camera.
Figure 19:
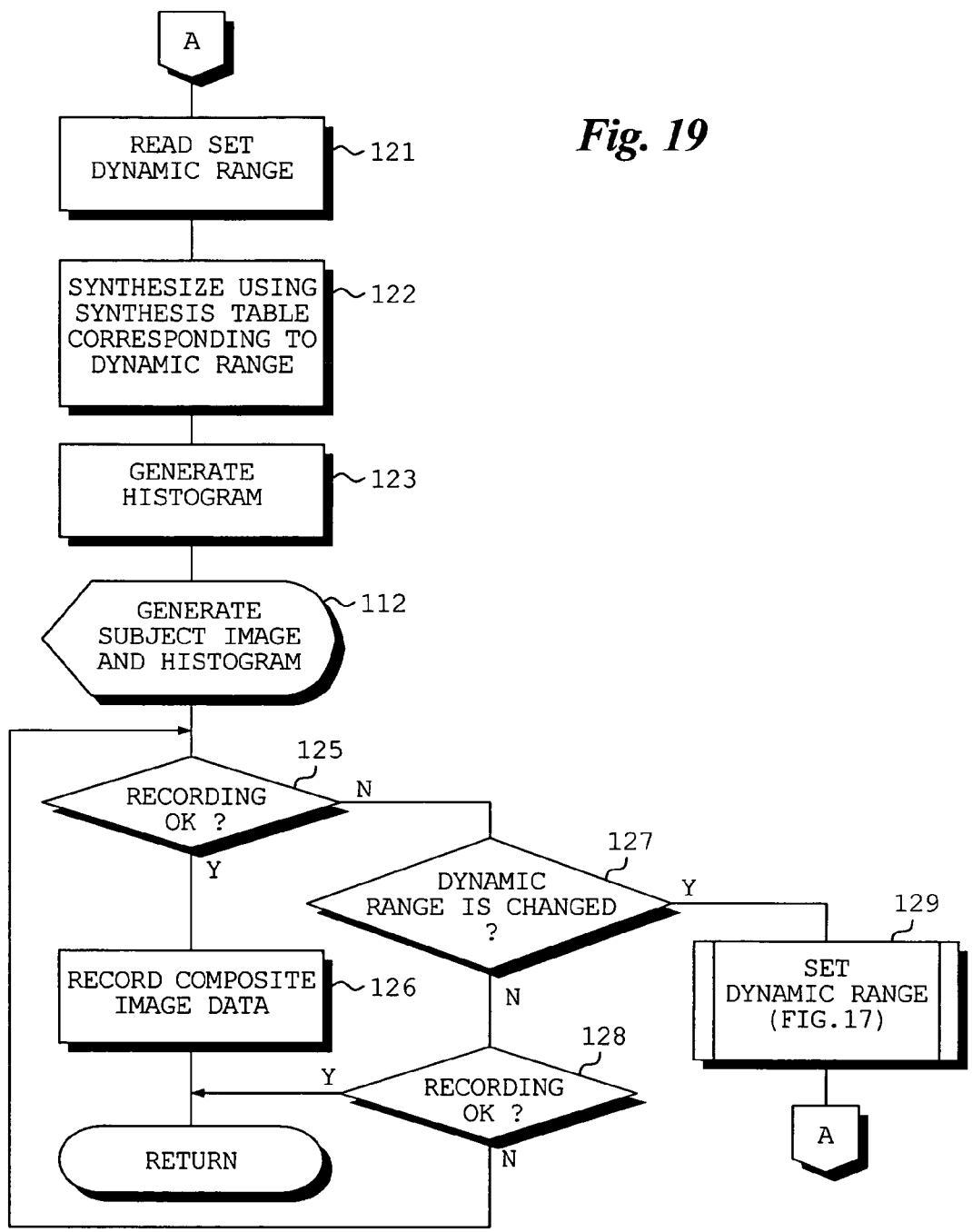

FIGS. 18 and 19 are flow charts showing the procedure for recording processing of the digital still camera.

When the shutter release button is pressed (YES in step 111), high-sensitivity image data and low-sensitivity image data that represent a subject image are obtained (step 112). The value of an automatic dynamic range is calculated, as described above, from the obtained low-sensitivity image data (step 113).

It is judged whether or not preview REC is set to ON (step 114) (preview REC can be set utilizing a menu displayed on the display screen 90 by pressing the menu/OK button 100).

Unless preview REC is set to ON (NO in step 114), a dynamic range set as described above is read (step 115). Composite image data is generated, as described above, using a synthesis table corresponding to the read dynamic range (step 116). A subject image represented by the composite image data is displayed on the display screen 90 (step 117), so that the composite image data is recorded on the memory card (step 118).

Even when preview REC is set to ON (YES in step 114), a dynamic range set as described above is read (step 121). Composite image data is generated, as described above, using a synthesis table corresponding to the read dynamic range (step 122). A histogram representing the frequency of appearance for each level is then generated from the generated composite image data (step 123). The generated histogram and the subject image represented by the composite image data are displayed on the display screen 90 (step 124). The user can confirm whether or not the composite image data representing the subject image is recorded on the memory card by seeing the histogram and the subject image that are displayed on the display screen 90.

In a case where the composite image data representing the displayed subject image is recorded on the memory card, the menu/OK button 100 is pressed by the user (YES in step 125).

Consequently, the composite image data representing the subject image is recorded on the memory card (step 126).

If the user does not like the displayed subject image, the dynamic range is changed or canceled. In a case where the dynamic range is changed (YES in step 127), processing for changing the dynamic range is performed in accordance with the processing shown in FIG. 11 (step 129). The processing from the steps 121 to 125 is repeated in the changed dynamic range. When the cancel button 96 is pressed (YES in step 128), the composite image data is not recorded on the memory card, so that the recording processing is terminated.

Figure 20:
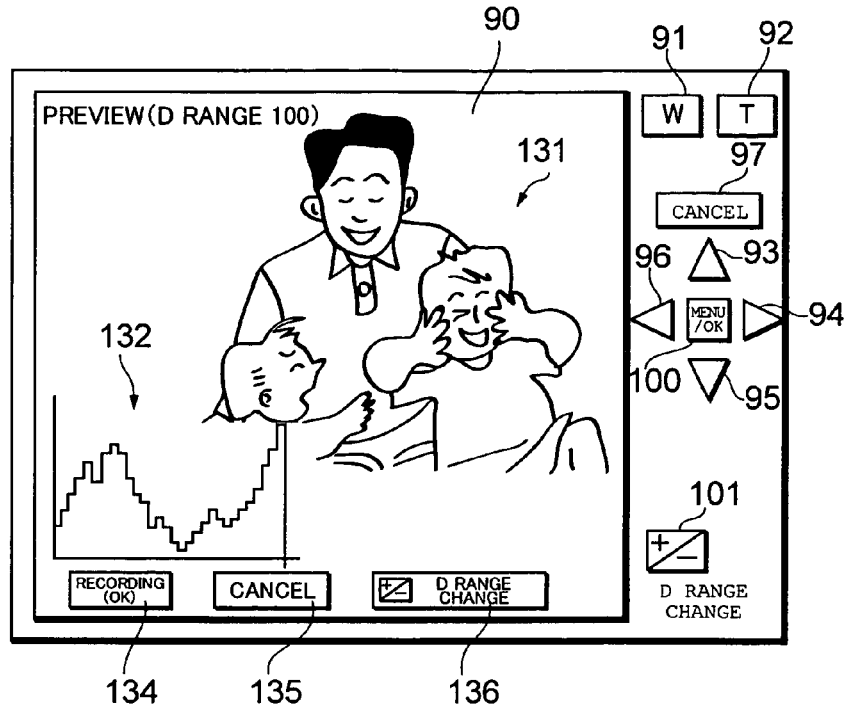
FIGS. 20 and 21 are rear views of the digital still camera.
Figure 21:
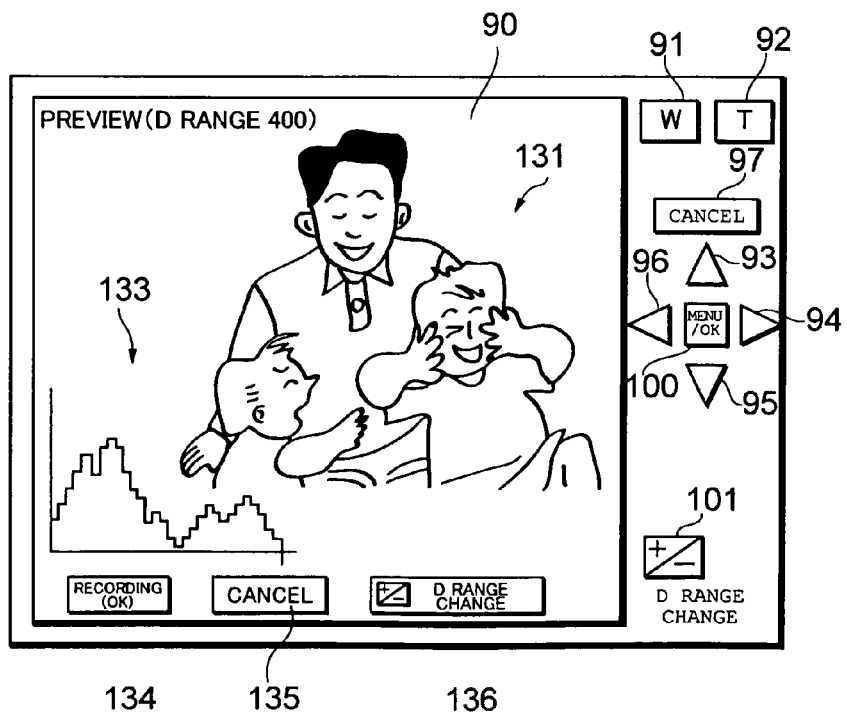

FIGS. 20 and 21 are rear views of the digital still camera. In the drawings, the same components as those shown in FIGS. 12 to 16 are assigned the same reference numerals and hence, the description thereof is not repeated.

Referring to FIG. 20, when preview REC is set, a subject image 131 represented by composite image data and a histogram of the composite image data (the histogram of the subject image) 132 are displayed, as described, on the display screen 90. In the histogram 132, the horizontal axis indicates the level of the composite image data (gray levels from white to black of the subject image), and the vertical axis indicates the frequency of appearance of the level of the composite image data. The histogram 132 can be calculated by the CPU 2. A guidance 134 suggesting that the menu/OK button 100 should be pressed when the composite image data representing the displayed subject image is recorded on the memory card, a guidance 135 suggesting that the cancel button 97 should be pressed when the dynamic range is canceled, and a guidance 136 suggesting that the dynamic range change button 101 should be pressed when the dynamic range is changed are also displayed on the display screen 90.

It can be confirmed whether or not the composite image data is worth being recorded on the memory card by confirming the subject image. Particularly in the present embodiment, the histogram 132 is also displayed, so that it can be also confirmed whether or not the composite image data is worth being recorded on the memory card by confirming the histogram 132. For example, the histogram 132 shown in FIG. 20 shows that there are a relatively large number of portions at a high image data level. Thus, it is considered that the composite image data does not fall within the set dynamic range, so that the dynamic range is changed.

Referring to FIG. 21, the level of image data covers the entire area of a histogram 133 displayed on the display screen 90 shown in FIG. 21 on average. Accordingly, it is considered that composite image data falls within the set dynamic range.

Not only a subject image but also the histogram is displayed on the display screen 90, so that the level distribution of the composite image data is relatively easy to understand.

Figure 22:
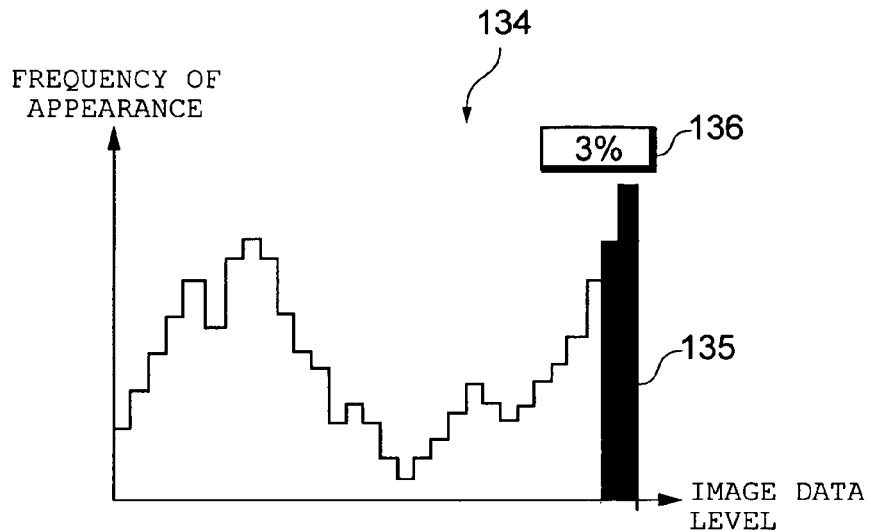
FIGS. 22 and 23 respectively show examples of a histogram.
Figure 23:
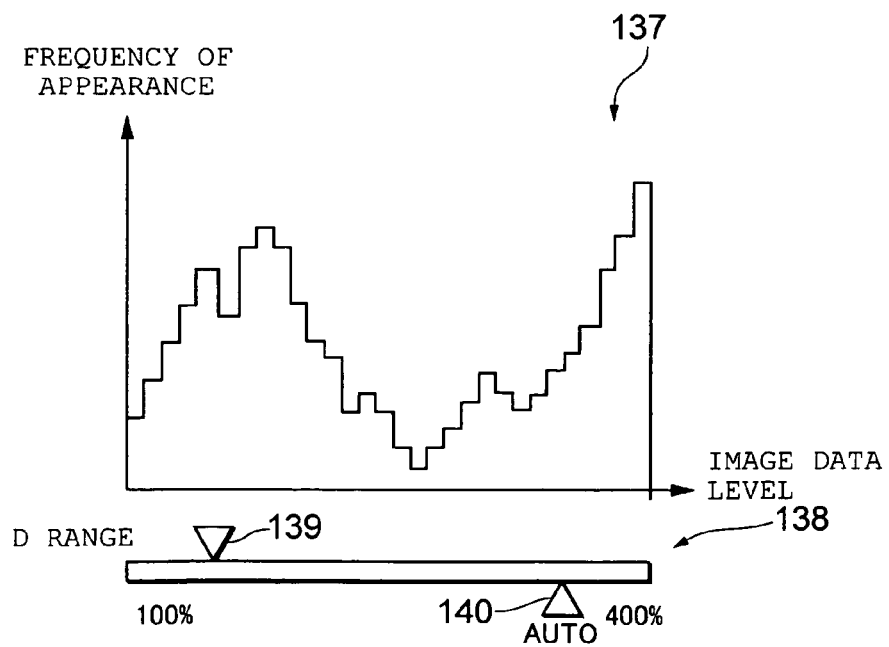

FIGS. 22 and 23 show another example of a histogram displayed on the display screen 90.

In a histogram 134 shown in FIG. 22, in a case where the level of composite image data is divided into 256 levels from 0 to 255, the frequency of appearance of a high level of not less than 240 is indicated by a black coat 135. Further, the ratio (3%) of the frequency of appearance of a high level to the whole is displayed on the black coat 134.

The user can judge whether or not a set dynamic range is proper by seeing the black coat 135 representing the frequency of appearance of a high level and the ratio 136 of the frequency of appearance of a high level to the whole. In a case where the user judges that the dynamic range is not proper, the dynamic range can be changed, as described above. Composite image data having the relatively proper dynamic range can be obtained.

In FIG. 23, a dynamic range scale 138 is displayed below a histogram 137. The dynamic range scale 138 corresponds to a range (from 100% to 400% in FIG. 23) of a dynamic range that can be set depending on a recording mode. A first mark 139 representing a dynamic range set by the user is displayed on the dynamic range scale 138 in correspondence with a dynamic range represented by the dynamic range scale 138. A second mark 140 representing a dynamic range calculated by an automatic dynamic range is displayed under the dynamic range scale 138 in correspondence with the dynamic range scale 138. In a case where the automatic dynamic range is set by the user, it goes without saying that the display position of the first mark 139 and the display position of the second mark 140 are the same.

The user can compare the dynamic range set by the user with the automatic dynamic range, and can change the dynamic range as required.

FIG. 24 shows the data structure (file structure) of the memory card.

A recording region of the memory card includes an Exif (exchangeable image file format) recording region, a parameter recording region for high-sensitivity image data, a parameter recording region for low-sensitivity image data, a high-sensitivity RAW image data recording region, and a low-sensitivity RAW image data recording region.

Data representing imaging information (a shutter speed, an f-stop value, a date of imaging, etc.) or the like in a case where imaging is performed using the digital still camera is recorded on the Exif recording region.

Parameters and others such as an LMTX (Linear Matrix) value, a WB (White Balance) gain value, an automatic dynamic range Dauto, a dynamic range Dset set by a user, the maximum dynamic range Dmax that can be changed, and a synthesis table (coefficients hgain and lgain) are recorded on the parameter recording region for high-sensitivity image data. The LMTX value is the parameter used for performing color tone correction in the linear matrix circuit 32. The WB gain value is a gain value used in gain control carried out in the WB/Gain circuit 33.

The same parameters as the parameters and others recorded on the parameter recording region for high-sensitivity image data are also recorded on the parameter recording region for low-sensitivity image data.

High-sensitivity image data and low-sensitivity image data after offset adjustment are respectively recorded on the high-sensitivity RAW image data recording region and the low-sensitivity RAW image data recording region.

Figure 25:
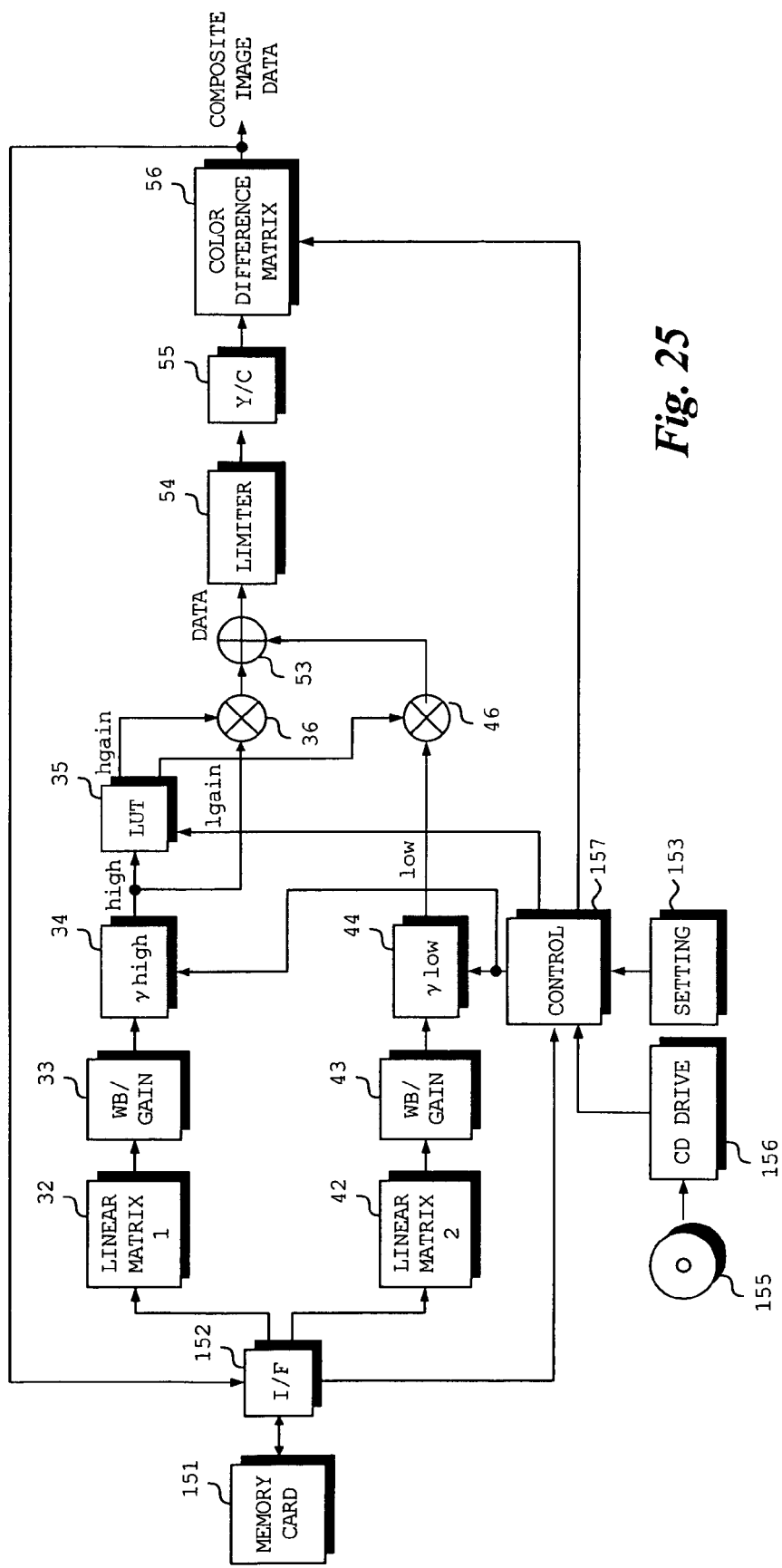
FIG. 25 is a block diagram showing the electrical configuration of an image data synthesis device.

FIG. 25 is a block diagram showing the electrical configuration of an image synthesis device (that may be implemented by a personal computer). In FIG. 25, circuits identical to the circuits shown in FIG. 2 are respectively assigned the same reference numerals and hence, the description thereof is not repeated.

The overall operation of the image synthesis device is supervised by a control device 157.

The image synthesis device comprises a CD drive 156. A CD-ROM (Compact Disk-Read Only Memory) 155 stores a program for performing operations, described later. The program stored in the CD-ROM 155 is read by the CD drive 156, and is installed in the control device 157.

A memory card 151 having the data structure shown in FIG. 24 is loaded into the image synthesis device, and is connected to an interface 152. High-sensitivity RAW image data, low-sensitivity RAW image data, and parameters that are recoded on the memory card 151 are read by the interface 152. The high-sensitivity RAW image data, the low-sensitivity RAW image data, and the parameters and others are respectively given to the first linear matrix circuit 32, the second linear matrix circuit 42, and the control circuit 157.

Out of the parameters and others given from the memory card 151, a synthesis table is given to the LUT 35. A read color difference gain correction value is given to the color difference matrix circuit 56. It will be understood that composite image data DATA having a set dynamic range Dset is generated by the LUT 35, the multiplication circuit 36, and an addition circuit 53. The generated composite image data is recorded on a hard disk by a hard disk drive (not shown).

Even in the image synthesis device, a composite image can be adjusted such that it can have a dynamic range desired by the user within the maximum dynamic range Dmax. Therefore, the image synthesis device is provided with a setting device 153. The setting device 153 also comprises a keyboard, a mouse, and so on. Further, the image synthesis device also comprises a display device (not shown). The dynamic range setting image 70 shown in FIG. 12 is displayed on a display screen of the display device.

Figure 26:
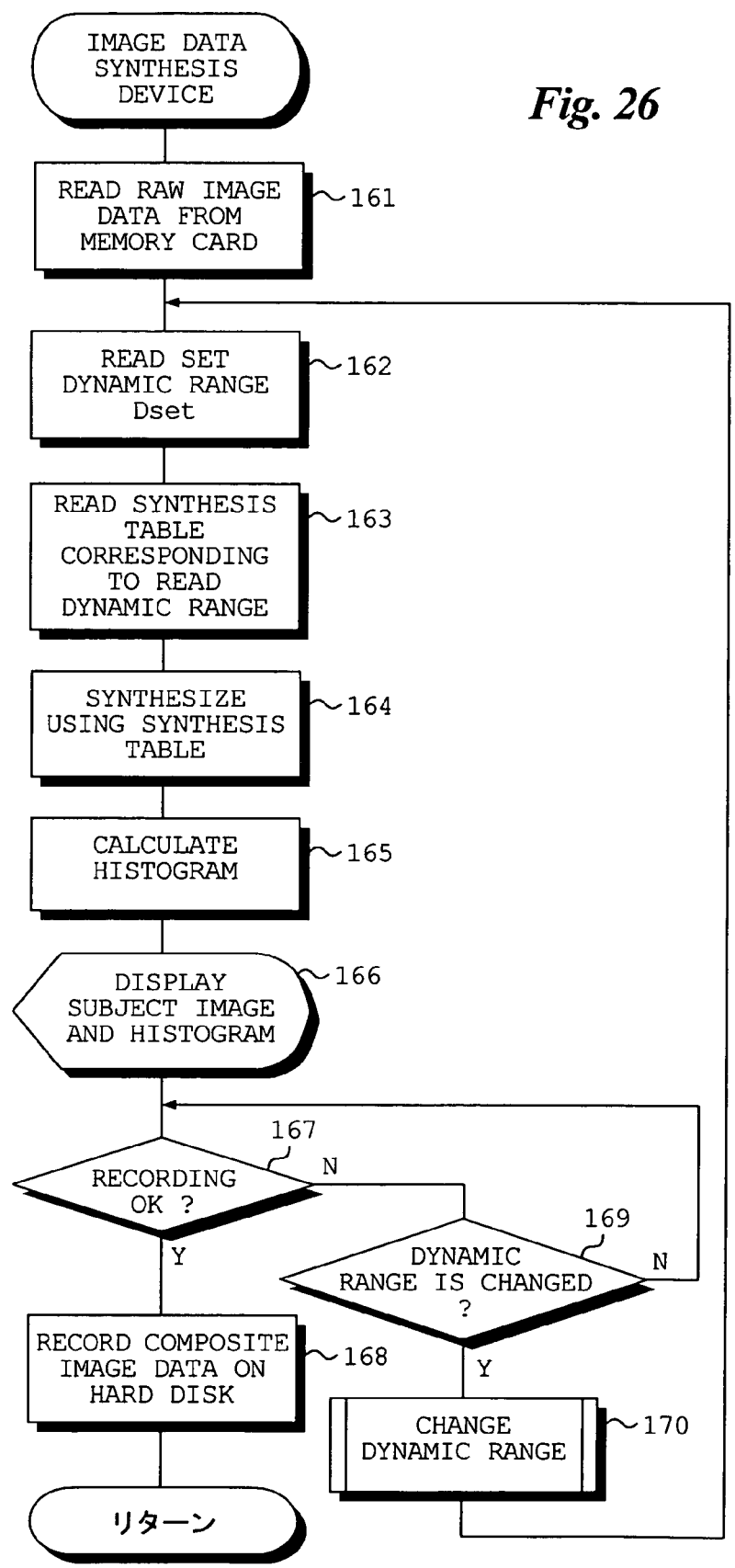
FIG. 26 is a flow chart showing the procedure for processing of the image data synthesis device.

FIG. 26 is a flow chart showing the procedure for processing of the image synthesis device.

High-sensitivity RAW image data and low-sensitivity RAW image data are read from the memory card 151 (step 161). The set dynamic range Dset is read from the memory card 151 (step 162), and a corresponding synthesis table is also read from the memory card 151 (step 163). The high-sensitivity RAW image data and the low-sensitivity RAW image data are synthesized using the read synthesis table (step 164).

A histogram of composite image data obtained by the synthesis is calculated (step 165), and the calculated histogram, together with a subject image represented by the composite image data, is displayed on the display device (step 166).

In a case where the displayed subject image and histogram are confirmed to record the composite image data representing the subject image on the hard disk, a recording instruction is issued from the setting device 153 (YES in step 167). Consequently, the obtained composite image data is recorded on the hard disk (step 168).

In a case where the dynamic range of the subject image is changed (NO in step 167, YES in step 169), a dynamic range change instruction is issued from the setting device 153. Consequently, the dynamic range can be changed, as described above (step 170). Composite image data having the desired dynamic range can be recorded on the hard disk within the maximum dynamic range.

Although in the above-mentioned embodiment, the image synthesis device is composed of a hardware circuit, it may be implemented by software.

Although in the above-mentioned embodiment, the high-sensitivity video signal is obtained on the basis of the signal charges stored in the main light receiving region 21 in the photodiode 20, and the low-sensitivity video signal is obtained on the basis of the signal charges stored in the sub-light receiving region 22 in the photodiode 20, the high-sensitivity video signal and the low-sensitivity video signal may be obtained by imaging an identical subject two times under the conditions of different amounts of exposure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite image data generating apparatus, comprising:

an image data synthesis device that synthesizes applied high-sensitivity image data and applied low-sensitivity image data at a ratio determined on a basis of a dynamic range to output composite image data;

a histogram data generation device that generates histogram data representing a histogram of a composite image represented by the composite image data outputted from said image data synthesis device;

a display control device that controls a display device so as to display the composite image represented by the composite image data outputted from said image data synthesis device and the histogram generated by said histogram data generation device;

a dynamic range designation device that designates the dynamic range; and a synthesis control device that controls said image data synthesis device so as to synthesize the applied high-sensitivity image data and the applied low-sensitivity image data in response to a change in the dynamic range by said dynamic range designation device at a ratio determined on a basis of the changed dynamic range, wherein said display control device controls the display device to display dynamic ranges corresponding to preset recording applications, in which each preset recording application has corresponding dynamic range values associated with said preset recording application, wherein said dynamic range designation device designates the dynamic range in the dynamic ranges suitable for a recording application displayed on the display device, and wherein dynamic ranges not corresponding to said each preset recording application are other than displayed.

2. The composite image data generating apparatus according to claim 1, wherein said display control device controls said display device so as to display the histogram in such a manner that a frequency of appearance of composite image data whose level is not less than a predetermined level differs from another frequency of appearance.

3. The composite image data generating apparatus according to claim 1, wherein said image data synthesis device synthesizes the applied high-sensitivity image data and the applied low-sensitivity image data at the ratio determined on the basis of the dynamic range to output the composite image data, and wherein an automatic dynamic range determination device determines an automatic dynamic range on a basis of at least one of said high-sensitivity image data and said low-sensitivity image data, said display control device controlling said display device so as to display the dynamic range designated by said dynamic range designation device and the automatic dynamic range determined by said automatic dynamic range determination device in relation to an image of a dynamic range scale representing a range of the dynamic range.

4. The composite image data generating apparatus according to claim 1, further comprising:

a solid-state electronic imaging device that images a subject to output said high-sensitivity image data and said low-sensitivity image data that represent a subject image, said image data synthesis device synthesizing the high-sensitivity image data and the low-sensitivity image data that are outputted from said solid-state electronic imaging device at a ratio determined on a basis of the dynamic range designated by said dynamic range designation device.

5. The composite image data generating apparatus according to claim 1, further comprising:

a composite image display control device that controls the display device so as to display the composite image represented by the composite image data outputted from said image data synthesis device; and a recording instruction switch that issues a recording instruction, the composite image data representing an image displayed on the display device being recorded on a recording medium on a basis of a control of said composite image display control device in response to an issue of the recording instruction from said recording instruction switch.

6. A composite image data generating method, comprising synthesizing applied high-sensitivity image data and applied low-sensitivity image data at a ratio determined on a basis of a dynamic range to obtain composite image data;

generating histogram data representing a histogram of a composite image represented by the obtained composite image data;

controlling a display device so as to display the composite image represented by the obtained composite image data and the generated histogram;

providing a dynamic range designation device that designates the dynamic range; and synthesizing the applied high-sensitivity image data and the applied low-sensitivity image data in response to a change in the dynamic range by said dynamic range designation device at a ratio determined on a basis of the changed dynamic range, wherein a display control device controls the display device to display dynamic ranges corresponding to preset recording applications, in which each preset recording application has corresponding dynamic range values associated with said preset recording application, wherein said dynamic range designation device designates the dynamic range in the dynamic ranges suitable for a recording application displayed on the display device, and wherein dynamic ranges not corresponding to said each preset recording application are other than displayed.

7. A non-transitory computer-readable medium storing a program for controlling a composite image data generating apparatus that synthesizes applied high-sensitivity image data and applied low-sensitivity image data at a ratio determined on a basis of a dynamic range to obtain composite image data so as to:

generate histogram data representing a histogram of a composite image represented by the obtained composite image data;

control a display device so as to display the composite image represented by the obtained composite image data and the generated histogram; and synthesize the applied high-sensitivity image data and the applied low-sensitivity image data in response to a change in the dynamic range by a dynamic range designation device at a ratio determined on a basis of the changed dynamic range, wherein said program causes a display control device to control the display device for displaying dynamic ranges corresponding to preset recording applications, in which each preset recording application has corresponding dynamic range values associated with said preset recording application, wherein said program causes said dynamic range designation device to designate the dynamic range in the dynamic ranges suitable for a recording application displayed on the display device, and wherein dynamic ranges not corresponding to said each preset recording application are other than displayed.

8. The composite image data generating apparatus according to claim 1, wherein said display control device controls the display device to display a dynamic range scale corresponding to a range of dynamic ranges that can be set depending on the recording application, and to display a first mark representing a dynamic range set by a user and a second mark representing a dynamic range calculated by an automatic dynamic range determination device at the dynamic range scale.

9. The composite image data generating apparatus according to claim 1, wherein said display control device controls the display device to display a ratio of a frequency of appearance of a high level of not less than a prescribed level to a whole frequencies of appearance.

10. The composite image data generating method according to claim 6, wherein said display control device controls the display device to display a dynamic range scale corresponding to a range of dynamic ranges that can be set depending on the recording application, and to display a first mark representing a dynamic range set by a user and a second mark representing a dynamic range calculated by an automatic dynamic range determination device at the dynamic range scale.

11. The composite image data generating method according to claim 6, wherein said display control device controls the display device to display a ratio of a frequency of appearance of a high level of not less than a prescribed level to a whole frequencies of appearance.

12. The non-transitory computer-readable medium according to claim 7, wherein said display control device controls the display device to display a dynamic range scale corresponding to a range of dynamic ranges that can be set depending on the recording application, and to display a first mark representing a dynamic range set by a user and a second mark representing a dynamic range calculated by an automatic dynamic range determination device at the dynamic range scale.

13. The non-transitory computer-readable medium according to claim 7, wherein said display control device controls the display device to display a ratio of a frequency of appearance of a high level of not less than a prescribed level to a whole frequencies of appearance.

* * * * *